United States Patent
Yunus et al.

(10) Patent No.: US 7,849,448 B2
(45) Date of Patent: Dec. 7, 2010

(54) TECHNIQUE FOR DETERMINING WEB SERVICES VULNERABILITIES AND COMPLIANCE

(75) Inventors: Mamoon Yunus, Newton, MA (US); Rizwan Mallal, Newton, MA (US)

(73) Assignee: Crosscheck Networks, Newton, MA (US)

( * ) Notice: Subject to any disclaimer, the term of this patent is extended or adjusted under 35 U.S.C. 154(b) by 1204 days.

(21) Appl. No.: 11/438,961

(22) Filed: May 23, 2006

(65) Prior Publication Data

US 2006/0277606 A1    Dec. 7, 2006

Related U.S. Application Data

(60) Provisional application No. 60/686,242, filed on Jun. 1, 2005.

(51) Int. Cl.
  *G06F 9/44*    (2006.01)
  *G06F 12/14*   (2006.01)
  *G06F 11/00*   (2006.01)
  *G06F 15/16*   (2006.01)

(52) U.S. Cl. .................. 717/126; 717/108; 717/127; 717/131; 726/25; 714/25; 714/38; 714/46; 709/203

(58) Field of Classification Search .............. None
See application file for complete search history.

(56) References Cited

U.S. PATENT DOCUMENTS

| | | | |
|---|---|---|---|
| 5,892,903 A | 4/1999 | Klaus | |
| 6,584,569 B2 * | 6/2003 | Reshef et al. | 726/25 |
| 7,028,223 B1 * | 4/2006 | Kolawa et al. | 714/38 |
| 2005/0154939 A1 * | 7/2005 | De Pauw et al. | 714/25 |
| 2006/0101397 A1 * | 5/2006 | Mercer et al. | 717/120 |

OTHER PUBLICATIONS

Suet Chun Lee, "Generating Test Cases XML-based Web Component Interactions Using Mutation Analysis", 12th IEEE International Symposium on Software Re-liability Engineering, pp. 200-209, Nov. 2001.*
"XML Schema Part 2: Datatypes Second Edition", World Wide Web Consortium (W3C) Recommendation, Oct. 28, 2004, pp. 1-131.
"XML Schema Part 1: Structures Second Edition", W3C Recommendation, Oct. 28, 2004, pp. 1-191.
"XML Schema Part 0: Primer Second Edition", W3C Recommendation, Oct. 28, 2004, pp. 1-69.
"Basic Profile Version 1.1 Final Material", Web Services Interoperability Organization (WS-I), Aug. 24, 2004, pp. 1-45.
"Simple Object Access Protocol (SOAP) 1.1", W3C Note, May 8, 2000, pp. 1-32.

* cited by examiner

*Primary Examiner*—Tuan Q Dam
*Assistant Examiner*—Isaac T Tecklu
(74) *Attorney, Agent, or Firm*—Hamilton, Brook, Smith & Reynolds, P.C.

(57) ABSTRACT

A technique for testing applications for vulnerabilities that may be as a result of loosely defined criteria and restrictions associated with interfacing to the applications. Interfaces associated with an application to be tested are identified. The interfaces may include the names of services provided by the application as well as parameters that are passed to the services. One or more mutant requests containing one or more mutations are then generated based on the identified interfaces. The application is then attacked by forwarding the mutant requests to the application. Vulnerabilities of the application that were exposed as a result of the attack are then detected.

29 Claims, 18 Drawing Sheets

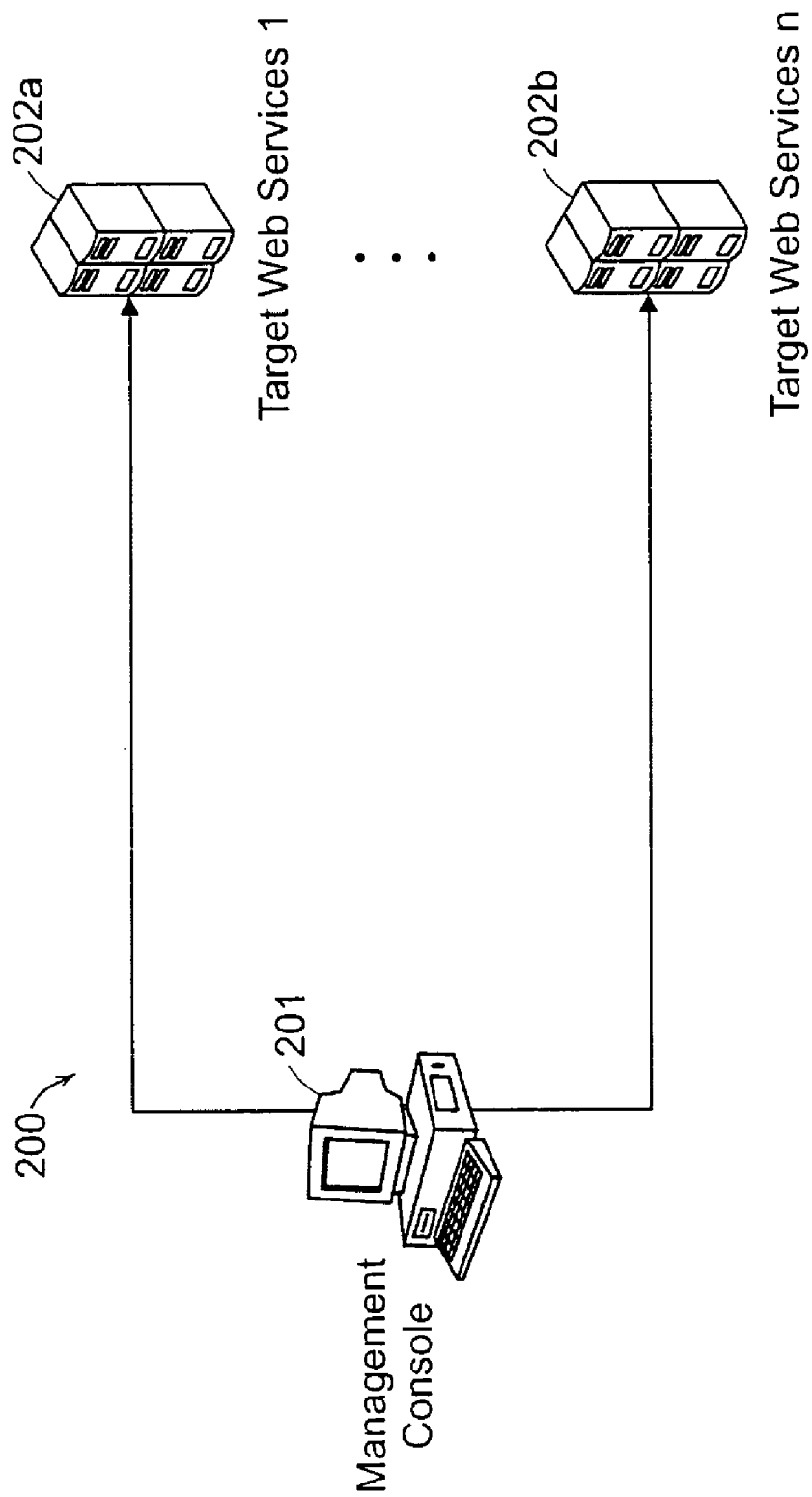

View Attack

Attack: Replicate Node ccsn0:getQuote 2 times with XSD maxOccuis=1    2 of 2

```
<?xml version="1.0" encoding="utf-8"?>
<soap:Envelope xmlns:soap="http://schemas.xmlsoap.org/soap/envelope/" xmlns:xs
i="http://www.w3.org/2001/XMLSchema-instance" xmlns:xsd="http://www.w3.org/200
1/XMLSchema" xmlns:soapenc="http://schemas.xmlsoap.org/soap/encoding/" xmlns:c
csn0="urn:xmethods-delayed-quotes">
  <soap:Body soap : encodingStyle="http://schemas.xmlsoap.org/soap/encoding/">
    <ccsn0:getQuote>CXNSXSD-{97a70bee-2216-41b0-8d51-d3b6c8427e27}|1|1| CXNSXSD
      <symbol xsi:type ="xsd:string"></symbol></ccsn0:getQuote>       ~704
    <ccsn0:getQuote>CXNSXSD-{97a70bee-2216-41b0-8d51-d3b6c8427e27}|1|1| CXNSXSD
      <symbol xsi:type="xsd:string"></symbol></ccsn0:getQuote>
  </soap:Body>
</soap:Envelope>
```
~705

Attack Request | Original Request
~706

[ Next ]  [ Close ]

FIG. 7B

View WSI BP 1.1 Compliance Function

Function : R9980 (Create New First Envelope Child)

1 of 3

```
<?xml version="1.0" enconding="utf-8"?>
<soap:Envelope xmlns:soap="http://schemas.xmlsoap.org/soap/envelope/" xmlns:xsi="http://www.w3.org/2001/XMLSchema-instance" xmlns:xsd="http://www.w3.org/2001/XMLSchema" xmlns:s
oapenc="http://schemas.xmlsoap.org/soap/encoding/" xmlns:ccsn0="urn:xmethods-delayed-quo
tes">
    <soap : Body soap : encodingStyle="http://schemas.xmlsoap.org/soap/encoding/">
        <ccsn0:getQuote>
            <symbol xsi : type="xsd:string">IBM</symbol>  ← 802
        </ccsn0:getQuote>
    </soap : Body>
</soap : Envelope>
```

Compliance Test Request | Original Request ← 801

Next    Close

FIG. 8A

Reporting and Logging

| Log View | Report View |
| --- | --- |
| Show All ▽ | Total: 56  Matching: 13 |

| Index | Vulnerability Group | Attack |
| --- | --- | --- |
| 44 | XSD Occurrence Attack | Omit Node symbol with XSD minOccurs=1 |
| 45 | XSD Occurrence Attack | Replicate Node symbol 2 times with XSD maxOccurs=1 |
| 46 | XSD Occurrence Attack | Omit Node ccsn0:getQuote with XSD minOccurs=1 |
| 47 | XSD Occurrence Attack | Replicate Node ccsn0:getQuote 2 times with XSD maxOccurs=1 |
| 48 | XSD NIL Attack | Set symbol to xsl:nil=true |

Request

```
<?xml version="1.0" encoding="utf-8"?>
<soap:Envelope xmlns:soap="http://schemas.xmlsoap.org/soap/envelope/" xmlns:xsi="http://www.w3.org/2001/XMLSc   ← 1102
  <soap:Body soap:encodingStyle="http://schemas.xmlsoap.org/soap/encoding/">
  </soap:Body>
</soap:Envelope>
```
← 1103

Response

```
<?xml version="1.0" encoding=UTF-8"?>
<soap:envelope xmlns:soap"http://schemas.xmlsoap.org/soap/envelope/" xmlns:xsi="http://www.w3.org/2001/XMLSc   ← 1101
  <soap:Body>
    <soap:Fault>
      <faultcode>soap:Server</faultcode>
      <faultstring>1 is an invalid index</faultstring>
      <detail>
        <e:electric-detail xmlns:e="http://www.thamindelectric.com/">
          <class>java.lang.IndexOutOfBoundsException</class>
          <message>1 is an invalid index</message>
          <trace>java.lang.IndexOutOfBoundsException: 1 is an invalid index
          at electric.xml.Element.getElementAt(Element.java:541)
          at electric.net.soap.http.SOAPHandler.getPath(SOAPHandler.java:128)
          at electric.net.soap.http.SOAPHandler.service(SOAPHandler.java:76)
          at electric.server.http.ServletServer.service(ServletServer.java:218)
          at javax.servlet.http.HttpServlet.service(HttpServlet.java:853)
          at electric.net.servlet.Config.service(Config.java:182)
          at electric.net.http.HTTPContext.service(HTTPContext.java:118)
```

C:\Program Files\Crosscheck. Networks\SOAPSonar Enterprice\Vulnerability\StockQuoteService_1.xml Mode: Vulnerability

FIG. 11

Web Service Vulnerability Testing Results
xmethods-delayed-quotes.wsdl ←—1301

Vulnerabilities

- ☒☒☒☒ 0 Severity Critical
- ☒☒☒ 0 Severity High
- ☒☒ 1 Severity Medium
- ☒ 1 Severity Low
- ☐ 1 Severity Info

Detailed Vulnerabilities

☒☒☒☐☐ Vulnerability: EID5CCD5-09F2-41E8-9747-1C36A0C5A49E
APACHE Application Stack trace\language
Language used to code the Web Service
— 1302

Diagnosis: The language used to code a Web Service usually appears in a stack trace which could provide valuable information to an attacker. The language constructs can be used to determine what type of classes are being used by a Web Service and if they contain any known vendor specific vulnerabilities. A stack trace revealing that a Web Service is coded in Java for example immensely helps the attacker optimize his attack options.
— 1303

Remediation: Language information can prevented from reaching the client in a SOAP response if any of the following options are adopted.

1. Catching all the exceptions in the program elegantly.
2. Deploying a Web Services Firewall proxy which could cloak stack traces.
3. Deploying a Web Services firewall proxy which could silent dicard the SOAP response if a stack trace is seen.
— 1304

☒☒ Vulnerability: 3BFD39C6-0BA2-4437-B74C-06F72CF1059E
APACHE Application Stack trace\Comm Communication layer implementation.

FIG. 13A

Web Service Compliance Violation Results
xmethods-delayed-quotes.wsdl

Compliance Violations

- ☒☒☒☒☒ 16 Severity High
- ☒☒☒☒☐ 4 Severity Medium ←—1305
- ☐☐☐☐☐ 0 Severity Low

Compliance Violation Detail

| | | |
|---|---|---|
| ☒☒☒☒☒ | R9980 | An ENVELOPE MUST conform to the structure specified in SOAP 1.1 Section 4, "SOAP Envelope" ←—1306 (subject to amendment by the Profile). |
| ☒☒☒☒☒ | R1005 | An ENVELOPE MUST NOT contain soap:encodingStyle attributes on any of the elements whose namespace name is "http://schemas.xmlsoap.org/soap/envelope/." |
| ☒☒☒☒☒ | R1006 | An ENVELOPE MUST NOT contain soap:encodingStyle attributes on any element that is a child of soap:Body. |
| ☒☒☒☒☒ | R1008 | An ENVELOPE MUST NOT contain a document Type Declaration. |
| ☒☒☒☒☒ | R1009 | An ENVELOPE MUST NOT contain Processing Instructions. ←—1307 |
| ☒☒☒☒☒ | R1011 | An ENVELOPE MUST NOT have any element children of soap:Envelope following the soap:Body element. |
| ☒☒☒☒☒ | R1013 | An ENVELOPE containing a soap:mustUnderstand attribute MUST only use the lexical forms "0" and "1". |
| ☒☒☒☒☒ | R1014 | The children of the soap:Body element in an ENVELOPE MUST be namespace qualified. |
| ☒☒☒☒☒ | R1015 | A RECEIVER MUST generate a fault if they encounter an envelope whose document element is not soap:Envelope. |
| ☒☒☒☒☒ | R1025 | A RECEIVER MUST handle envelopes in such a way that it appears that all checking of mandatory |

FIG. 13B

TECHNIQUE FOR DETERMINING WEB SERVICES VULNERABILITIES AND COMPLIANCE

RELATED APPLICATION(S)

This application claims the benefit of U.S. Provisional Application No. 60/686,242 filed on Jun. 1, 2005 the entire teachings of the above application are incorporated herein by reference.

BACKGROUND

The techniques described herein generally relate to web services and more specifically to determining vulnerabilities and compliance of web services.

Today, millions of computers are connected via a heterogeneous network that is often referred to as the World Wide Web (WWW) or the Internet. The well-known Hypertext Markup Language (HTML) standard is often used by computers on the Internet to exchange as well as display information. HTML contains provisions for specifying what information is displayed as well as how the information is presented. However, as more and more users have adopt the Internet to conduct day-to-day operations and use HTML to exchange and display information associated with these operations, the limitations of HTML have become apparent.

While HTML is very good at displaying information associated with consumer-oriented applications, such as shopping carts, it lacks the necessary richness to dynamically describe information in detail and in various formats for application-to-application and machine-to-machine communication. The well-known Extensible Markup Language (XML) provides the capability to richly describe information in a flexible way where content, structure and data format are represented independently for efficient machine readability and exchange. XML is designed to give meaningful structure to data and the ability to dynamically add rules on how the data is to be interpreted by another party.

An XML document is said to be "well-formed" when it abides by constraints defined by properties carried by the document. These constraints may include, for example, (1) having exactly one root element, (2) requiring that every start tag contained in the document has a matching end tag and (3) requiring that no tag within the document overlaps with another tag. XML documents typically start with a declaration of the XML version and the type of encoding being used to encode the document. For example, a document may be encoded with the declaration "<?xml version='1.0' encoding='utf-8'?>" which indicates than XML version 1.0 is being used with 8-bit Unicode Transformation Format (utf-8) type encoding.

An XML document may contain one or more elements. In accordance with XML, an element comprises a start tag, an end tag and data contained between the start tag and end tag. For example, an element name "Patent" may be coded in XML as:

<Patent> XML </Patent>

Here, "Patent" is a tag (name) associated with the element and the content of the element is the text "XML". "<Patent>" is the start tag of the element and "</Patent>" is the end tag of the element.

An attribute in XML comprises a simple name-value pair where the value may be in single or double quotes. For example, consider the following exemplary XML code:

<Patent Type="Network Security"> XML </Patent>

Here, the element "Patent" has a name-value attribute whose name is "Type" and value is "Network Security".

When XML documents travel from a sender computer to a receiver computer it is important that both computers have the same expectations about the content. That is, both computers should have the same expectations about the content in terms of the way the sender describes the content so it will be understood by the receiver. Schemas are often used to set out and define these expectations. One commonly used schema for the XML language is the XML Schema.

XML Schema is a well-known World Wide Web Consortium (W3C) recommendation that defines a set of rules to which an XML document must conform in order to be considered "valid". A receiver expecting XML documents to be sent to it that conform to the XML Schema may use the schema to validate the content of the documents. Even if a document is well-formed it may still contain errors and those errors may cause problems for the receiver. Since XML Schema describes the structure of an XML document it provides an additional check for both sender and receiver to validate the document. XML Schema is also commonly referred to as the XML Schema Definition (XSD).

One of the greatest strength of XSD is its support for data types. This support enables the validation of data as to its correctness, describes permissible data and defines restrictions on the values that an element can take through the use of facets. Strong data-typing and restrictions are essential for building secure applications that are not vulnerable to buffer-overflow and Denial-of-Service (DoS) type attacks.

An application that accepts an XML document typically validates the XML document against an XSD either during or before the document is consumed by the application. XML document validation serves as a filter to ensure that the XML document adheres to a structural and data-type format expected from the consuming application.

The Simple Object Access Protocol (SOAP) is a protocol that may be used to exchange XML based messages using the, e.g., Hypertext Transport protocol (HTTP). A SOAP message comprises an envelope that contains an optional header and a required body. The purpose of the header is to provide information to an application as to how to process the message. Information such as routing, user name tokens and signatures can reside in the header. The body contains the actual message to be delivered to the target application for processing. The body may consist of anything that can be expressed in XML. Additionally, XML and non-XML attachments (e.g., images, Portable Document Format (PDF) files, word processing documents) may be attached to the SOAP message.

SOAP and XML messages are flexible in that they are protocol, hardware, and operating system independent. This flexibility enables applications to readily communicate with one another. Protocol independence here means that SOAP and XML messages may be exchanged between two entities using various protocols. For example, SOAP and XML messages may be exchanged using HTTP, secured HTTP (HTTPS), Java Messaging Service (JMS), File Transfer Protocol (FTP) and the Simple Mail Transfer Protocol (SMTP). Scanning for web services vulnerabilities, compliance exception and exploits typically requires generating SOAP-based and XML-based tests that are focused on the message, regardless of what protocol is being used to communicate with the application.

SOAP messages, their content, the application end-point where they are received and the structure of the response are not specified by the SOAP specification. Moreover, the SOAP specification does not provide a description of the SOAP message exchange with an application.

The Web Services Description Language (WSDL) is a language standard that is typically used to describe web services for an application. WSDL is an XML format for describing network services as end-points that operate on e.g., SOAP or XML messages. The operations and messages associated with the web services are described along with data types of the SOAP messages through an XSD included in the WSDL file. The messages and operations may then be bound to concrete various protocols, such as Hypertext Transport Protocol (HTTP), Secure HTTP (HTTPS), Simple Mail Transport Protocol (SMTP), File Transport Protocol (FTP), Java Message Service (JMS).

Web services describe a standardized way of integrating applications using e.g., the XML, SOAP, WSDL and Universal Description, Discovery and Integration (UDDI) open standards. In a typical arrangement, XML is used to tag data for an application, SOAP is used to transfer the data to the application, WSDL is used to describe services that are available for the application and UDDI is used for listing what described services are available.

The Web Services Interoperability (WS-I) organization is an open industry organization charted to promote web services interoperability across platforms, operating systems and programming languages. The WS-I Basic Profile specification developed by the WS-I organization provides rules and restrictions that may be used to ensure interoperability of SOAP and WSDL across a variety of platforms. The WS-I Basic Profile specification puts a boundary around the WSDL, SOAP and HTTP specification so as to ensure that WS-I Basic Profile compliant WSDL and SOAP messages over HTTP interoperate with one another regardless of the operating system, application, and programming language that may be used.

The WS-I Basic Security Profile specification provides rules and restrictions that may be used to ensure security interoperability of SOAP messaging across a variety of platforms. Further, a number of additional standards such as WS-Security 1.1, Secure Assertion Markup Language (SAML), WS-Policy, WS-Trust, WS-RM, Web Services Distributed Management (WSDM), Business Process Execution Language (BPEL) and general WS-* specifications provide rich security, identity, management, process orchestration, and monitoring functionality for deploying complex web services in a Service Oriented Architecture (SOA).

SUMMARY

One of the problems with the Extensible Markup Language (XML) Schema Definition (XSD) is that a poorly authored XSD that validates XML documents against a set of loosely defined criteria or restrictions may leave a wide-open door for web services vulnerabilities and exploits.

The techniques described herein provide a novel approach to testing applications for vulnerabilities that may be as a result of loosely defined criteria and restrictions associated with interfacing to the applications. According to these techniques, interfaces associated with an application to be tested are identified. The interfaces may include the names of services provided by the application as well as parameters that are passed to the services. One or more mutant requests containing one or more mutations are then generated based on the identified interfaces. The application is then attacked by forwarding the mutant requests to the application. Vulnerabilities of the application that were exposed as a result of the attack are then detected. This detection may include analyzing responses received from the application as well as determining if the application has, e.g., crashed or is otherwise unresponsive.

In accordance with the techniques described herein, interfaces associated with the application may be identified using a description of the interfaces. Here, the description may be contained in a file. Moreover, documents (messages) sent to the application may be monitored and analyzed to identify the interfaces. Here, information about services called by the interfaces may be extracted from the documents and analyzed to identify the interfaces.

BRIEF DESCRIPTION OF THE DRAWINGS

The foregoing will be apparent from the following more particular description of example embodiments of the techniques described herein, as illustrated in the accompanying drawings in which like reference characters refer to the same parts throughout the different views. The drawings are not necessarily to scale, emphasis instead being placed upon illustrating embodiments of the techniques.

FIG. 2A is a block diagram of a communications network comprising a single loading client targeting web services.

FIG. 7B illustrates a version of the SOAP message in FIG. 7A that is mutated in accordance with the techniques.

FIG. 8A illustrates an exemplary SOAP Message in accordance with a Web Services Interoperability (WS-I) Basic Profile specification.

FIG. 11 illustrates an exemplary display of a sample response capture and review where a user may determine if a response triggered an existing detection criterion and if a new detection rule needs to be authored.

FIG. 13A illustrates an exemplary report listing vulnerability details for a target web service.

FIG. 13B illustrates an exemplary report listing interoperability compliance violations for a target web service.

DETAILED DESCRIPTION

A description of preferred embodiments of the techniques described herein follows.

Reference will now be made to the drawings in which aspects of the techniques are given numerical designations and in which the techniques will be discussed so as to enable one skilled in the art to make and use the techniques. It is to be understood that the following description is only exemplary of the principles of the techniques, and should not be viewed as narrowing the claims which follow.

Aspects of the techniques described herein are deployed in a network for web services compliance, penetration, quality testing and vulnerability discovery. Web services relates to a standardized way of integrating applications using e.g., the well-known Simple Object Access Protocol (SOAP), Web Services Description Languages (WSDL) and Universal Description, Discovery and Integration (UDDI) open standards. A version of SOAP that may be used with the techniques described herein is described in "Simple Object Access Protocol (SOAP) 1.1" (SOAP 1.1 specification) which is available from the World Wide Web Consortium (W3C) and which is incorporated by reference as though fully set forth herein.

Figure 1:
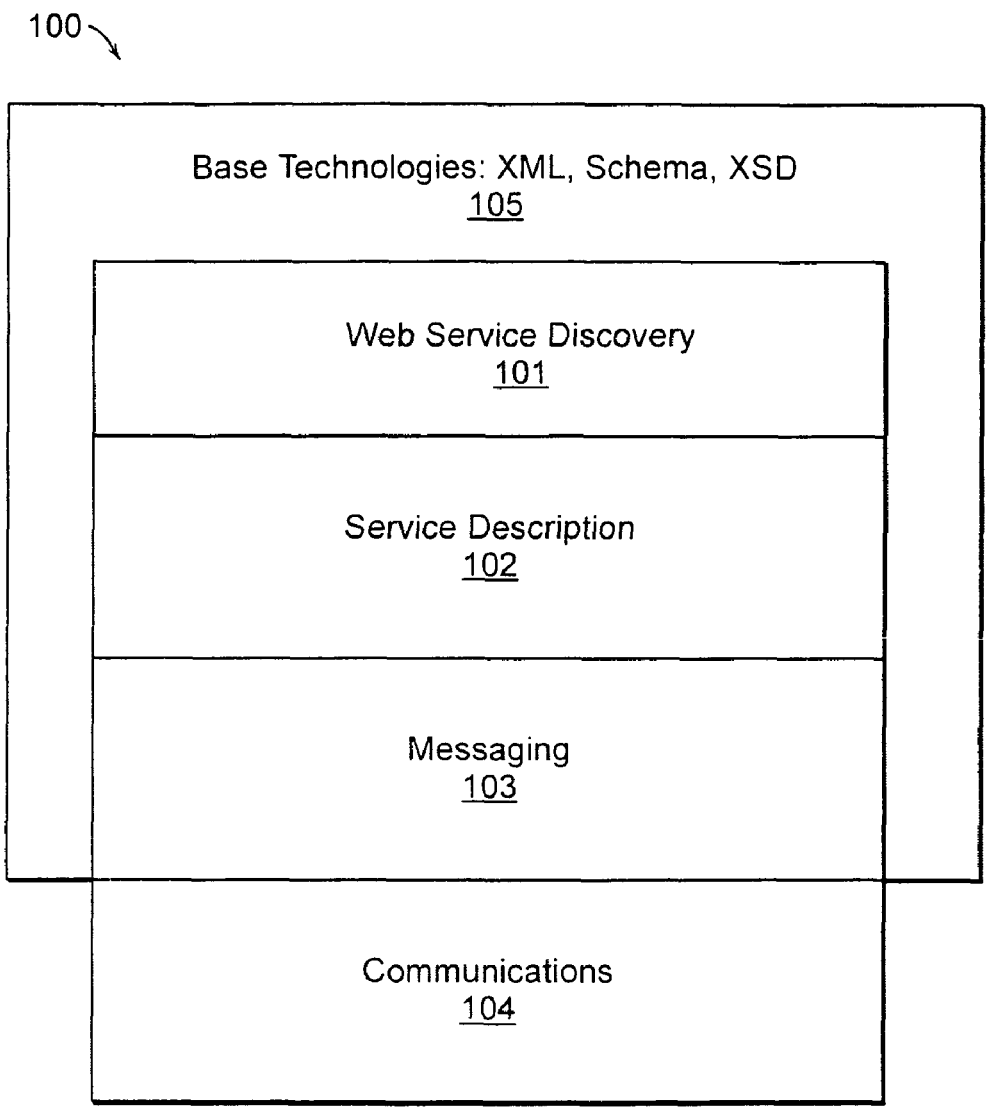
FIG. 1 is a block diagram of a Web Services Stack.

FIG. 1 is a block diagram of an exemplary web services stack 100. Stack 100 comprises a communications layer 104, a messaging layer 103, a service description layer 102 and a web service discovery layer 101. The messaging layer 103, service description layer 102 and web services discovery layer 101 utilize Extensible Markup Language (XML)-based technologies 100 that make up the foundation of web services. These technologies may include SOAP, WSDL and UDDI, respectively. The web services are independent of the communication layer 104 which may use various communication protocols, such as the well-known Hypertext Transfer Protocol (HTTP) and Secure HTTP (HTTPS), Java Message Service (JMS), Simple Mail Transport Protocol (SMTP), File Transfer Protocol (FTP), Internet Inter-Object Request Broker Protocol (IIOP) and the like to communicate with the web services. It should be noted that the web services are not restricted to web applications. Most any application, regardless of the protocol required to communicate with it, may expose its interface using web services.

Used primarily as a means for businesses to communicate with each other and with internal applications, web services allow organizations to communicate data without intimate knowledge of each other's Information Technology (IT) systems (e.g., the language, operating systems, network topology, infrastucture components and their dependencies of the systems). Unlike traditional client-server models, such as a web applications designed to present content to a user's browser, web services are typically designed for application-to-application communication typically without involving a browser. Web services share business logic, data and processes through a programmatic interface across a network. Programmers can then develop a web application that invokes web services of an application to offer specific functionality of the application to end-users. Generally, web services do not require the use of end-user browsers or HTML.

Unlike web applications that need to be actuated to discover the application interface, application interfaces in accordance with the techniques described herein are not discovered through actuation of a web application. These techniques use non-actuating methods for interface discovery, such as loading a known interface defined apriori through a service description 102 (e.g., WSDL), or loading passively captured messages (e.g., SOAP messages, XML messages) exchanged between consumers and producers.

Exposing vulnerabilities in web applications that provide users web-based applications over HTTP and HTTPS, such as shopping carts, is an important task addressed by web application scanning tools. One example of such tool is the AppScan® tool available from Watchfire, Inc. of Waltham, Mass. Another example of a scanning tool is described in U.S. Pat. No. 6,584,569 to Reshef, et al.

Products such as Watchfire's AppScan® tend to focus on applications over HTTP and in exposing vulnerabilities by manipulating and mutuating the HTTP request to a web application. XML, SOAP and WSDL-based scanning for exposing security vulnerability compliance and interoperability irregularities across HTTP, HTTPS, FTP, SMTP, JMS are not addressed. A need therefore exists to test and expose such vulnerabilities in web services and applications, such as Customer Relationship Management (CRM), Enterprise Resource Planning (ERP), Data Base Management System (DBMS), Application Server and Web Servers that expose their program interfaces as web services.

Exposing vulnerabilities at the networking level is crucial to ensure that vulnerabilities at the Open Systems Interconnection (OSI) transport-layer level are identified and are ideally fixed before exploits occur. Typical networks scanners identify open holes in the network by scanning for ports left open by routers, switches, firewall and other network devices or applications. A network product that may be used to identify open holes in a network is the Internet Scanner product available from Internet Security Systems Incorporated, Atlanta, Ga. A technique that may be used to identify open holes in a network is described in U.S. Pat. No. 5,892,903 to Klaus.

In accordance with aspects of the techniques described herein, a WSDL file is imported into an application. The WSDL file may contain information about web services provided by an end-point server. This information may include operations that exist on the server, input and output messages for the operations and data types associated with the messages. After the WSDL file is imported, the service end-point, operation names, messages and data types listed in the WSDL is extracted. Web service compliance, interoperability, penetration, quality testing and vulnerability discovery tests are automatically generated using information inherent in the WSDL file as well as rules designated by sample specifications, such as the WS-I Basic Profiles specification and specifications that define aspects of XML Schema Definition (XSD). A version of the WS-I Basic Profiles specification that may be used with the techniques described herein is "WS-I Basic Security Profile Version 1.2" which is available from the Web Services Interoperability (WS-I) organization and which is incorporated herein by reference as in its entirety as though fully set forth herein. Specifications that defined aspects of XSD that may be used with the present invention include "XML Schema Part 0: Primer Second Edition", "XML Schema Part 1: Structures Second Edition", "XML Schema Part 2: Datatypes Second Edition" (collectively referred to herein as the "XSD specification") which are available from W3C and which are incorporated by reference in their entirety as though fully set forth herein. An XSD is an instance of an XML schema written in an XML Schema language. An XSD defines a type of XML document in terms of constraints upon what elements and attributes may appear, their relationship to each other, what types of data may be in them and so on.

FIG. 2A illustrates an exemplary communications network 200 involving a single loading agent that may be used with the techniques described herein. Network 200 comprises a management console node 201 and one or more target web service application nodes 202*a-b*. Node 201 comprises test control software and the loading agent. Functions performed by the test control software include generating test loads, capturing responses and generating reports that report, e.g., detected vulnerabilities, flaws, sensitive data leaks, and compliance irregularities in the web services present at nodes 202*a-b*. Functions performed by the loading agent include loading tests to the target web services nodes 202*a-b*. The nodes 201, 202, communicate in the network using various protocols, such as HTTP, HTTPS, SMTP and JMS.

In network 200, tests are automatically generated at the console node 201 and transferred to the target web services nodes 202*a-b* using the loading agent. Tests may be generated from various web services criteria, such as response content from a request made to a particular web service. After evaluating the response, a subsequent call may be dynamically made to the same or another web service based on the content of the response. Console node 201 may also be pre-configured with a pre-defined set of tests that perform, e.g., an invocation of a pre-defined sequence of web services on the various nodes 202*a-b*.

Figure 2B:
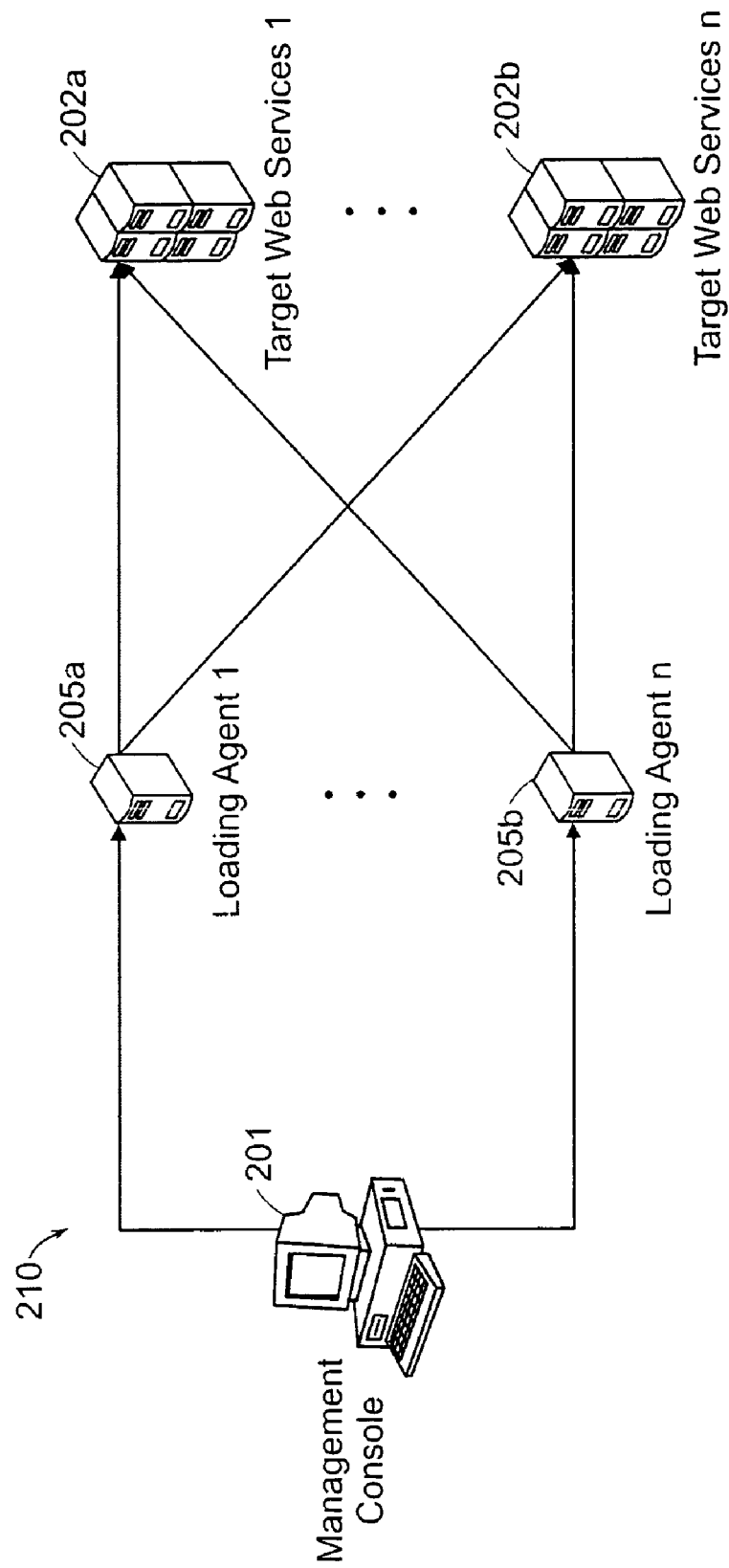
FIG. 2B is a block diagram of a communications network comprising a multiple distributed loading client targeting web services.

FIG. 2B illustrates an exemplary communications network 210 that is a variant of network 200 having distributed loading agents. Here, rather than residing at the console node 201, a loading agent is present at each loading agent node 205*a-b*. The loading agent nodes 205*a-b* communicate with other nodes in the network 210 using the protocols described above.

In network 210, the test control software at the console node 201 is further configured to transfer the tests to any of the loading agents at the distributed agent nodes 205*a-b*. The console 201 manages the loading agents to scale the test load for testing various web services at nodes 202*a-b*. The loading agents may also dynamically target various web services at nodes 202*a-b*, as described above.

Figure 2C:
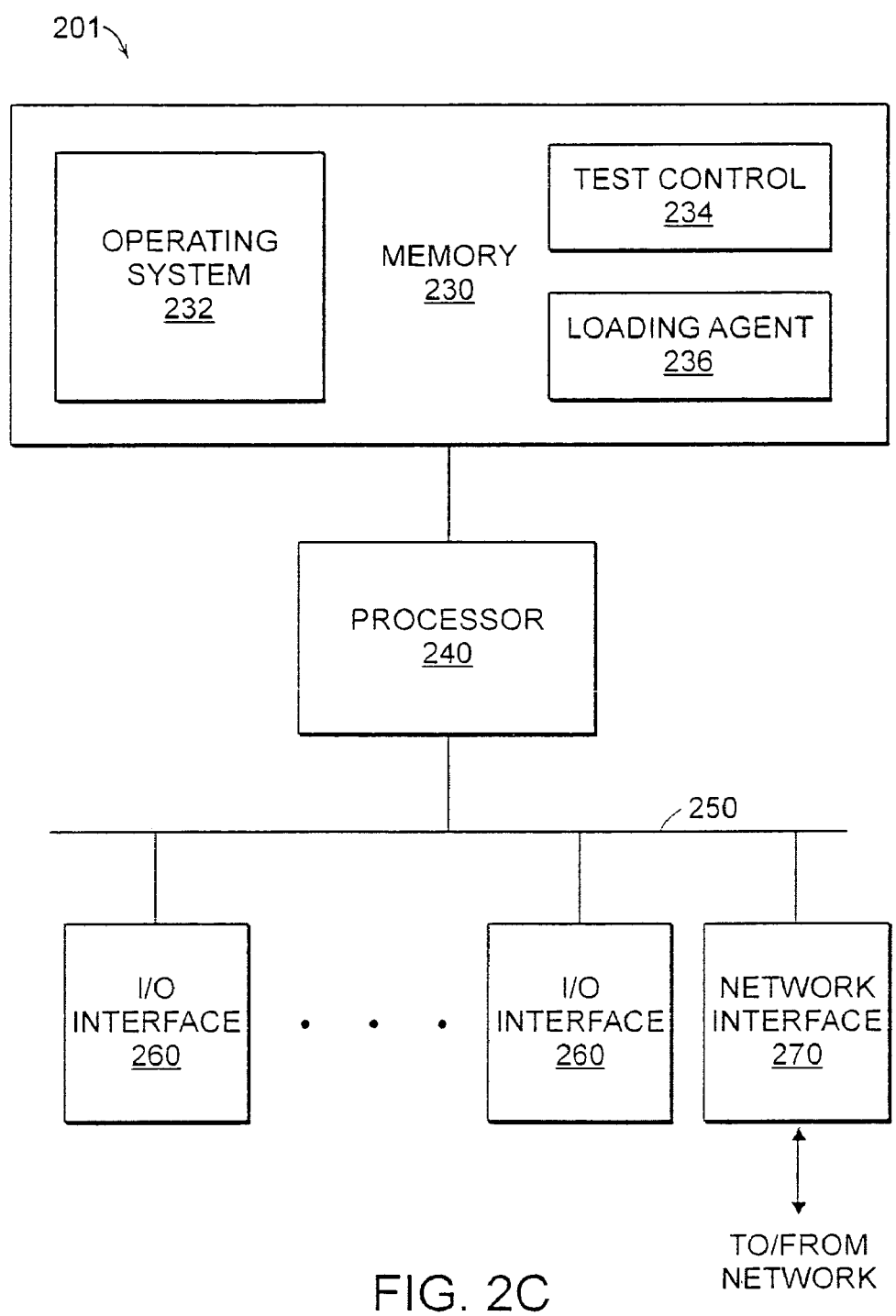
FIG. 2C is a block diagram of a node that may be used to implement aspects of the techniques described herein.

FIG. 2C is a high-level block diagram of console node 201. Node 201 is illustratively a computer system comprising a memory 230 coupled to a processor 240 which is coupled via an input/output (I/O) bus 250 to a network interface 270 and one or more I/O interfaces 260. An example of a computer system that may be used with the present invention is the Dell Inspiron XPS laptop computer available from Dell Incorporated, Round Rock, Tex. 78682.

Processor 240 is illustratively a conventional processor that contains logic for executing instructions and manipulating data contained in memory 230. Network interface 270 contains logic configured to interface node 201 with the networks 200, 210 and enable data to be transferred between node 201 and the networks 200, 210. I/O interfaces 260 contain logic configured to interface various I/O devices (not shown) with the processor 240 to enable the processor 240 to transfer data between the processor 240 and the I/O devices. These I/O devices may include storage devices (e.g., disk storage units), output devices (e.g., display units, printers) and input devices (e.g., keyboards, mice).

Memory 230 is a computer readable medium configured as a random access memory (RAM). Memory 230 may be implemented using, e.g., Dynamic RAM (DRAM) devices. Memory 230 comprises an operating system 232, test control software 234 and loading agent 236. The operating system 232 is a conventional operating system that contains software that enables software, such as test control software 234 and loading agent 236, to, inter alia, be scheduled for execution and to access various devices on node 201, such as network interface 270. An operating system that may be used with the present invention is the Microsoft XP operating system, available from Microsoft Corporation, Redmond, Wash. The test control software 234 and the loading agent 236 comprise computer executable instructions configured to implement aspects of the techniques described herein.

Figure 3:
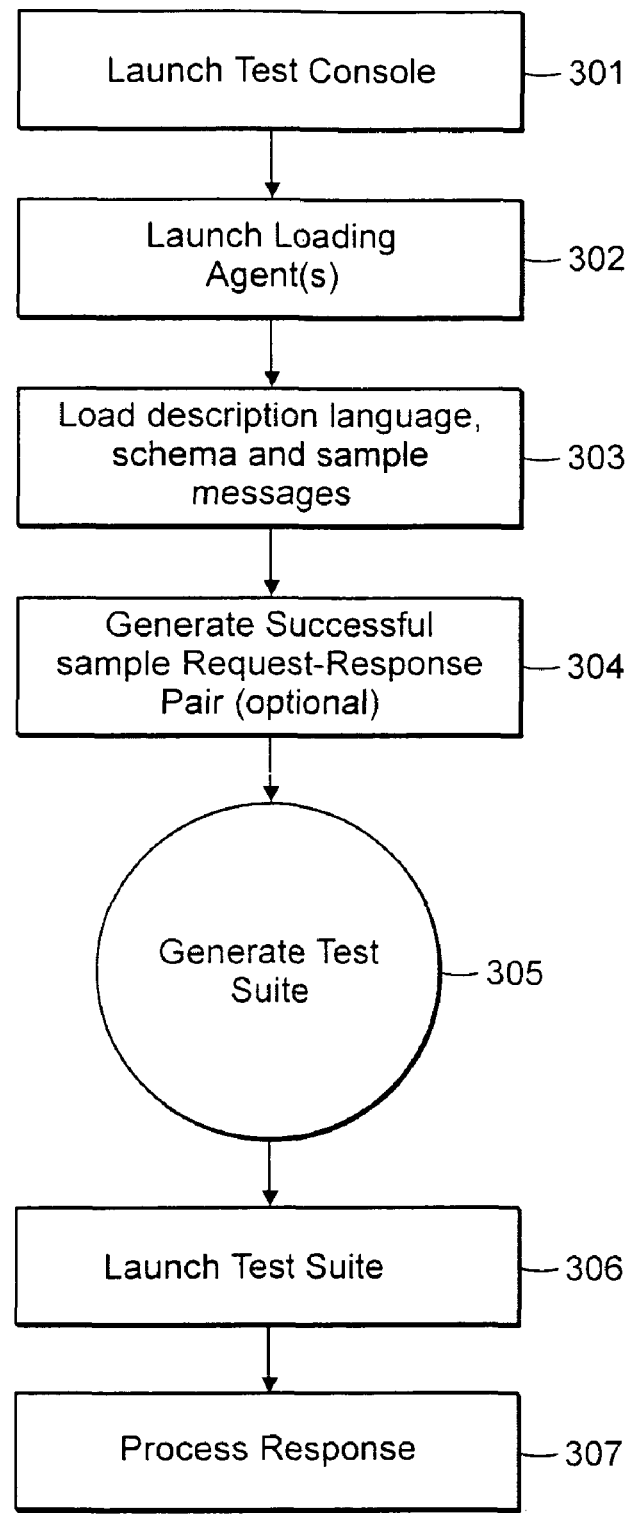
FIG. 3 is a flow chart of a sequence of steps for setting up tests for a target web service.

FIG. 3 is a flowchart of a sequence of steps that may be used to generate tests for various target web services in accordance with the techniques described herein. At step 301 the management console software is launched at the management console 201. At step 302, the loading agent is launched. Here, if loading agents nodes 205 are used, the loading agents are launched on the loading agent nodes 205 otherwise a loading agent is launched at the management console 201.

At step 303, the management console 201 loads a combination of the description (e.g., specified using WSDL) of the web services, a schema of the sample messages (e.g., specified using XSD) and one or more sample messages (e.g., SOAP messages, XML messages) used to communicate with the web services at the target web services nodes 202*a-b*. For example, assume the description for the web services is specified using WSDL and contained in a file (WSDL file). Console 201 loads the WSDL file that describes the operations hosted by the web services nodes 202*a-b*. The WSDL file may be loaded into the console 201 using a variety of mechanisms, such as (1) directly from the console host (2) using a published Universal Resource Indicator (URI) for the WSDL file's location (3) or a UDDI search for the file's location.

It should be noted that the locating and loading of information about the web services is not restricted to WSDL files. Other techniques may be used to construct information regarding the web services. Such techniques may include loading an XSD Schema or, an XML or SOAP message. One technique that enables capture of SOAP and XML messages is described in commonly owned U.S. Provisional Application No. 60/742,722, by R. Mallal, et al., which is hereby incorporated by reference in its entirety as though fully set forth herein.

Depending on the web service being tested, at step 304, a successful sample request-response pair is optionally generated for the web service. A number of web services may require a registration license key or identification parameter that has to be manually entered as a pre-requisite to auto-generating tests. The successful request-response test pair provides the information so that the test cases generated do not always fail because of a missing license key or Identification parameter. The license key or identification parameter is used as an example to illustrate mandatory parameters for successful request-response pairs. A web service may have any mandatory set of pre-requisite parameters for a successful request-response pair.

Various selective mutation rules may be activated in the console 201. A mutation rule is a rule that is used to generate mutations that are used to test web services on nodes 202*a-b*. The mutation rules may be driven by various WSI-Interoperability standards, XSD Schemas or emerging XML-based specifications. The tests can be enabled for any specific operation described by the WSDL loaded into the console 201. Details of sample mutations are described below.

At step 305, a suite of tests used to test the web services at nodes 202*a-b* are generated. The tests may be automatically generated based on, e.g., the description associated with the web services being tested, other techniques for capturing message structure, an optional successful request-response pair and mutation rules. Alternatively, some or all of the tests may be generated manually by a user. For example, a user may modify a web service operation's input parameter by removing a byte from an expected 32-byte input.

Once the tests are generated, the tester can review the individual test, and launch the test suite against the target web services at nodes 202a-b (step 306). At step 307, responses to the tests are captured by the console 201 and processed by a process response engine at the console 201. This processing may include, e.g., generating detailed reports for use by a user (e.g., a tester, security officer, compliance officer, etc.). Remedial recommendations may be presented as a part of the reports, as well.

Figure 4:
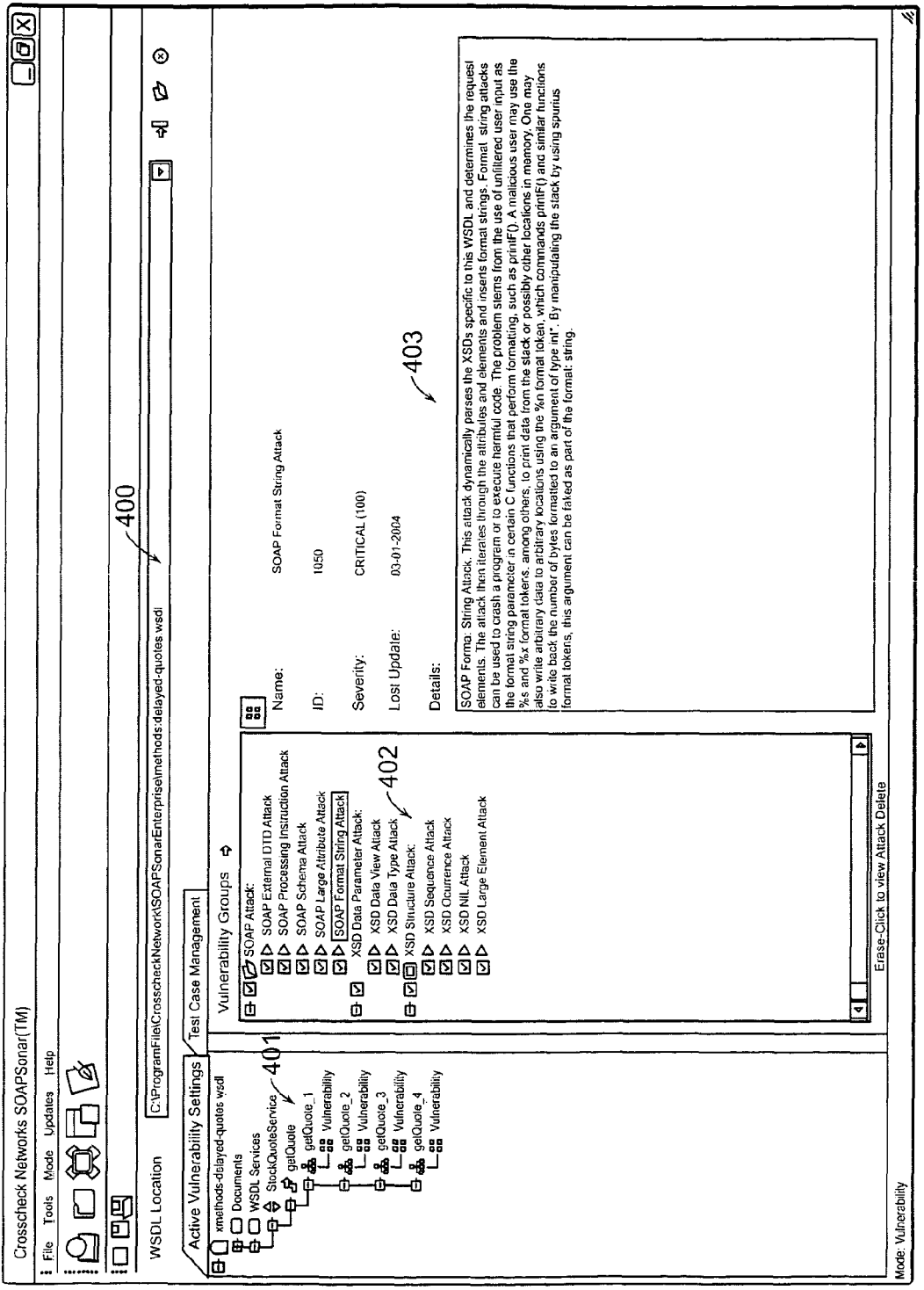
FIG. 4 illustrates an exemplary display that may be employed in a tool for loading a Web Services Description Language (WSDL) file and generating tests for target web services in accordance with the techniques.

FIG. 4 illustrates a display utilized by a tool that imports a WSDL file via a URI. The URI is specified as a WSDL location 400. The operations described by the imported WSDL are displayed in a navigation panel 401 contained in the display. The WSDL file is used to establish the structures of messages expected by the web services to be tested. It should be noted that other types of data, such as XML messages, SOAP messages and XSD Schemas may be used by the tool to establish the structure of messages expected by the target web services.

Operationally, a user at console 201 chooses an operation using the navigation panel 401. The user then selects which mutations to apply to the chosen operation as shown in panel 401. Details about the mutation rules, their severity, last update, and detailed description on the mutation are displayed in panel 403. The user may then choose to extend the library of mutation rules 402 by authoring or updating new rules based on, e.g., WS-I Interoperability, XSD-Schema, WS-Security or other standard.

Figure 5:
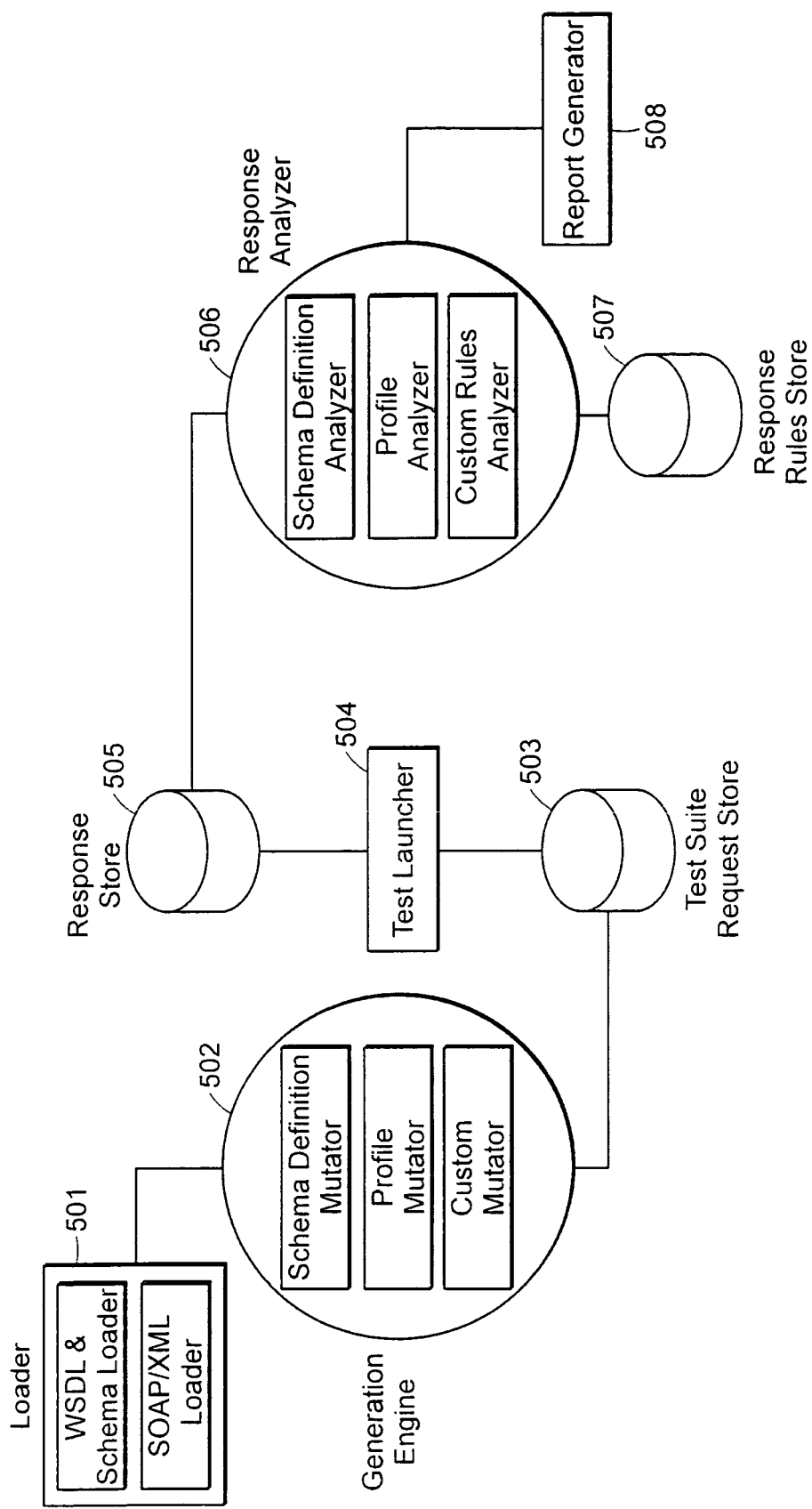
FIG. 5 is block diagram of internal components of an exemplary web services test tool that may employ the techniques.

FIG. 5 illustrates components of a test tool that may be used to perform compliance, vulnerability, and functional testing of web services. The test tool comprises of a loader 501, a generation engine 502, a test suite store 503, a test launcher 504, a response store 505, a response analyzer 506, a response rules store 507 and a report generator 508.

The loader 501 loads application specific information. This information may include a web services WSDL file containing a description of interfaces to services provided by the application. The file may be loaded through, e.g., a URI, file system or by pointing to a UDDI registry. The target application message structures may also be determined by loading schemas associated with the application, or by loading sample messages in XML or SOAP formats of messages associated with the application. These sample messages may be obtained out-of-band by from the provider of the application. The messages may also be captured by using packet capture methods as described in previously incorporated U.S. Provisional Application No. 60/742,722.

The message structure loaded by loader 501 is presented to the generation engine 502. The generation engine 502 comprises a number of "mutators" that are used to generate a suite of tests for the loaded message structure in accordance with the techniques described herein. A mutator is illustratively software that acts to mutate, e.g., an original document to produce a mutant document that may be used to test various web services. Types of mutators include, but are not limited to, schema definition mutators, profile mutators and custom mutators.

Schema definition mutators generate tests based on mutations derived from one or more specifications, such as XML, XSD Schema, SOAP and WSDL specifications, associated with the web services under test. Schema definition mutators may maintain mutations in a library that is assembled and may be extended based on various specifications such as various well-known emerging "WS-*" specifications (e.g., WS-Policy, WS-SecureConversation, WS-Addressing, etc.).

Profile mutators generate tests based on profiles such as WS-I Basic Profile and WS-I Basic Security Profiles to generate test suites. A custom mutator generates tests based on information (e.g., mutation rules) provided by e.g., a user.

All categories of mutators in the generation engine 502 may selectively act on information (e.g., message structure) loaded by the loader 501 to generate various test suites that are used to test the web services. These test suites are stored in storage system 503. Storage system 503 is a conventional storage system, such as a database, file system, or memory. The storage of the generated test is flexible such that the tests may be either stored in a database and/or in a file system. They may be stored remotely or locally, and/or may be distributed across multiple file systems and/or databases, or a combination thereof. This enables both testors and developers to share tests with their community as well as have a highly scalable way of storing a large number of automatically generated or manual generated tests.

The test launcher 504 launches the tests against the target web services at nodes 202a-b. The response store 505 captures and stores responses corresponding to mutant requests submitted to the web services under test.

The response analyzer 506 contains a schema definition analyzer, profile analyzer and a custom rules analyzer which are used to scan and analyze the stored responses using rules stored in the response rules store 507. Specifically, the schema definition analyzer applies specific rules stored in the response rules store 507 to the responses to recognize content contained in the responses as defined by specifications.

For example, a SOAP response message sent in response to a SOAP request message may contain fault information (e.g., a SOAP fault). The schema definition analyzer detects the fault information and based on its content matches it to a set of response rules in the response store 507. The matched rules contain details about the fault and severity levels associated with the fault. Similary, the profile analyzer matches profile specific rules stored in the response rules store 507 to responses captured in the response store 505. In addition, a user may author custom response rules and store them in rule store in 507. These rules may be for new and emerging standards as well as message content that is specific to a particular application. The rules may contain information that associates severity levels to the rules, accommodate diagnosis and provide remediation suggestions. The custom rules analyzer uses these rules to match against responses contained in the response store 505 to identify, e.g., severity levels, diagnosis and remediation suggestions associated with the responses.

After the response analyzer 506 has scanned through the stored responses and matched them against the response rules, the response analyzer 506 aggregates matches along with severity levels, exceptions, vulnerability postures, grammar results, profile results, and custom results associated with responses and sends it to the report generator 508 which generates reports (described below) from the information in a variety of formats including e.g., Portable Document Format (PDF), XML, word processing formats and Comma Separated Values (CSV) and the like.

To illustrate the above-described concepts, consider the following exemplary XSD contained in an XSD file named "personal_info.xsd":

1. <?xml version="1.0" encoding="ISO-8859-1"?>
2. <xs:schema xmlns:xs="http://www.w3.org/2001/XMLSchema"
3. elementFormDefault="qualified">
4. <xs:element name="persons">

-continued

```
5.    <xs:complexType>
6.      <xs:sequence>
7.        <xs:element name="person" maxOccurs="unbounded">
8.          <xs:complexType>
9.            <xs:sequence>
10.             <xs:element name="full_name" type="xs:string"/>
11.             <xs:element name="id_num" type="xs:integer"/>
12.             <xs:element name="birthday" type="xs:date"/>
13.             <xs:element name="child_name" type="xs:string"
14.               minOccurs="0" maxOccurs="3"/>
15.           </xs:sequence>
16.         </xs:complexType>
17.       </xs:element>
18.     </xs:sequence>
19.   </xs:complexType>
20. </xs:element>
21. </xs:schema>
```

In the above XSD, Line 4 "<xs:element name="persons">" contains a sequence of persons as defined by Line 7 "<xs:element name="person" maxOccurs="unbounded">" which in turn is made of a sequence of four elements declared in Lines 10-13. Line 10 shows element "full_name" of "string" data-type. Line 11 shows "id_num" of "integer" data-type. Line 12 shows an element "birthday" of date data-type and Lines 13-14 shows element "child_name" of the string data-type with a maximum permissible occurrence restricted to 3. Note that, XSD Schema has a number of built-in data types. The example above shows some of the most commonly used data-types in XSD Schema.

Now consider the following exemplary XML document that conforms to the above-described XSD:

```
1. <?xml version="1.0" encoding="ISO-8859-1"?>
2. <persons xmlns:xsi="http://www.w3.org/2001/XMLSchema-instance"
3.   xsi:noNamespaceSchemaLocation="personal_info.xsd">
4.   <person>
5.     <full_name>John Doe</full_name>
6.     <id_num>22212</id_num>
7.     <birthday>1980-12-12</birthday>
8.     <child_name>Cecilie</child_name>
9.   </person>
10. </persons>
```

Note that in the above XML message line 3 shows a reference to an XSD file the message conforms to which in this example is "personal_info.xsd". A schema validating parser may validate this XML document against this XSD file.

Using the above-described XSD file and XML document, an exemplary technique for creating different types of mutated messages is now described. The technique employs tampering and message mutation for checking the strength and existence of message validation at a receiving XML parser. The mutated or tampered messages are iteratively sent over to the target web server nodes 202a-b. The response and target server behavior is then evaluated to expose parser and application vulnerabilities. Sample categories of mutations are listed in Table 1 and described below:

TABLE 1

Sample Mutation Categories

| # | Mutation Type | Action |
|---|---|---|
| 1 | Data Type | Modifies message types |
| 2 | Data Value | Modifies message values |
| 3 | Structure Order | Modifies message structure |
| 4 | Structure Boundary | Modifies Structure boundary |
| 5 | Data Boundary | Modifies data value boundary |
| 6 | Attribute | All modification applicable |
| 7 | Complex Types | All modifications applicable |
| 8 | Other Mutations | Author Custom Mutations |

The first mutation, listed in Table 1, is a Data Type Mutation, where data, e.g., contained in an element of an XML document, is changed or mutated to another type of data not defined for that element. For example, in the "personal_info.xsd" XSD file above, the "birthday" element is defined as a date type. In the above XML document, the date is indeed a date type which conforms to the data type definition for this element as described in the XSD file. In the tampered or mutated version of the XML document illustrated below, the "birthday" element is mutated to contain a float value which does not conform to the data type definition for this element described in the XSD file.

```
1. <?xml version="1.0" encoding="ISO-8859-1"?>
2. <persons xmlns:xsi="http://www.w3.org/2001/XMLSchema-instance"
3.   xsi:noNamespaceSchemaLocation="personal_info.xsd">
4.   <person>
5.     <full_name>John Doe</full_name>
6.     <id_num>22212</id_num>
7.     <birthday>1934.24</birthday>
8.     <child_name>Cecilie</child_name>
9.   </person>
10. </persons>
```

The second mutation, listed in Table 1, is Data Value Mutation, where the value of the element is changed. For example, in the XSD file above describes the "id_num" element as an integer. In an exemplary mutated XML document below, the "id_num" element is mutated to contain alpha-numeric characters instead of purely numeric characters as required by the XSD schema.

```
1. <?xml version="1.0" encoding="ISO-8859-1"?>
2. <persons xmlns:xsi="http://www.w3.org/2001/XMLSchema-instance"
3.   xsi:noNamespaceSchemaLocation="personal_info.xsd">
4.   <person>
5.     <full_name>John Doe</full_name>
6.     <id_num>ss22212pp</id_num>
7.     <birthday>1980-12-12</birthday>
8.     <child_name>Cecilie</child_name>
9.   </person>
10. </persons>
```

The third mutation, listed in Table 1 above, is a Structure Order Mutation, where a sequence order is altered. For example, the <xs:sequence> tag in the above XSD file (i.e., personal_info.xsd) mandates that the <full_name> element should appear before <id_num> element. In an exemplary mutated XML document, as shown below, this sequence is reversed.

```
1.  <?xml version="1.0" encoding="ISO-8859-1"?>
2.  <persons xmlns:xsi="http://www.w3.org/2001/XMLSchema-instance"
3.  xsi:noNamespaceSchemaLocation="personal_info.xsd">
4.      <person>
5.          <id_num>22212</id_num>
6.          <full_name>John Doe<full_name>
7.          <birthday>1980-12-12</birthday>
8.          <child_name>Cecilie</child_name>
9.      </person>
10. </persons>
```

It should be noted that structure mutations may be generated for all the elements in the sequence tags, such that all combinations and permutations of orders are generated. For example, the test generation engine 502 may use <xs:sequence> tags contained in an XSD file along with a valid sample document that conforms to the XSD to generate a Structure Order Mutated document. Further, the test generation engine 502 may iteratively loop through all the elements in an XSD file and create documents with a changing order of the elements within the sequence.

The fourth mutation, listed in Table 1, is a Structure Boundary Mutation where boundaries associated with the structure of a document are mutated. This structure may include limits place on the number of occurrences of a particular element in the document.

For example, in the above XSD file, the "maxOccurs" parameter specifies that the maximum number of instances for an element is "3". Based on this value, the test generation engine 502, may generate a mutated XML document which violates this boundary. The below exemplary XML document illustrates this concept. Note that the document contains 4 occurrences of the element "child_name" which violates the structure of the document (as defined by the XSD file) which limits the maximum number of occurrences of any particular element to 3.

```
1.  <?xml version="1.0" encoding="ISO-8859-1"?>
2.  <persons xmlns:xsi="http://www.w3.org/2001/XMLSchema-instance"
3.  xsi:noNamespaceSchemaLocation="personal_info.xsd">
4.      <person>
5.          <full_name>John Doe</full_name>
6.          <id_num>22212</id_num>
7.          <birthday>1980-12-12</birthday>
8.          <child_name>Cecilie</child_name>
9.          <child_name>Bob</child_name>
10.         <child_name>Dave</child_name>
11.         <child_name>Ron</child_name>
12.     </person>
13. </persons>
```

The fifth mutation, listed in Table 1 above, is a Data Boundary Mutation. This mutation involves over extending a boundary that is placed on a particular data type. For example, data boundaries for data carried in documents are defined either inherently or explicitly by the XSD specification to which the documents conform. In the XSD file above, "xs:integer" is inherently defined as a 32-bit integer with a maximum value of 2,147,483,647. A Data Boundary Mutation for an xs:integer element may be generated by generating a value greater than this maximum value and specifying the value in an element that is an "xs:integer" data type. The exemplary XML document below illustrates this concept. Here, the "id_num" element contains a value (i.e., 3,000,000,000) which exceeds the maximum number permissible for that element's data type as defined by the above XSD file.

```
1.  <?xml version="1.0" encoding="ISO-8859-1"?>
2.  <persons xmlns:xsi="http://www.w3.org/2001/XMLSchema-instance"
3.  xsi:noNamespaceSchemaLocation="personal_info.xsd">
4.      <person>
5.          <full_name>John Doe</full_name>
6.          <id_num>3000000000</id_num>
7.          <birthday>1980-12-12</birthday>
8.          <child_name>Ron</child_name>
9.      </person>
10. </persons>
```

Similarly, certain restrictions may define the boundary of values permissible for an element. A mutator (e.g., test generation engine 502) may generate documents containing a Data Boundary Mutation that extends the values of an element beyond that dictated by a restriction.

For example, in the exemplary document below, an element called "age" may not have values that are lower than "0" or greater than "100." Once the test generation engine 502 recognizes keywords such as "xs:maxInclusive" and "xs:minInclusive" and the values associated with these restrictions of these data types, it generates values below and above the boundaries such that the mutated message contains <age>−1</age> or <age>101</age> as an exemplary Data Boundary Mutation.

```
1.  <xs:element name="age">
2.  <xs:simpleType>
3.      <xs:restriction base="xs:integer">
4.          <xs:minInclusive value="0"/>
5.          <xs:maxInclusive value="100"/>
6.      </xs:restriction>
7.  </xs:simpleType>
8.  </xs:element>
```

Note that other keywords may be used to develop Data Boundary Mutations. The test generation engine 502 uses such keywords to generate one or more mutated messages for testing of web services. These keywords may be keywords defined in specifications such as the XSD specification, WS-I Profile specification, custom specifications and the like. Table 2 lists various restriction keywords that may used by Generation Engine 502:

TABLE 2

Exemplary Keywords for Restrictions

| Keywords | Description |
| --- | --- |
| Enumeration | Defines a list of acceptable values |
| fractionDigits | Specifies the maximum number of decimal places allowed |
| Length | Specifies the exact number of characters or list items allowed |
| maxExclusive | Specifies the upper bounds for numeric values |
| maxInclusive | Specifies the upper bounds for numeric values |
| maxLength | Specifies the maximum number of characters or list items allowed |
| minExclusive | Specifies the lower bounds for numeric values |
| minInclusive | Author Custom Mutations |
| minLength | Specifies the minimum number of characters or list items allowed |
| Pattern | Defines the exact sequence of characters that are acceptable |
| totalDigits | Specifies the exact number of digits allowed. Must be greater than zero |
| whiteSpace | Specifies how white space (line feeds, tabs, spaces, and carriage returns) is handled |

Schemas provide support for both simple element and complex elements. Simple elements are elements that do not have attributes. Complex elements are elements that have attributes. An example of a complex element having an attribute whose name is "lang" and data type is "string: is as follows:

<firstname lang="English"></firstname>.

The mutations described above may be used with complex elements that contain attributes. For example, Data Type Mutations may be applied to a string attribute to mutate a string value to a float value.

Attributes may be specified with "default", "fixed", "optional" or "required" values. When the test generation engine 502 reads such attribute definitions in the schema or WSDL file containing the schema, it mutates the values so as to send, for example, a message with a removed attribute where a "required" attribute was specified. Such mutated message may be used to test e.g., web services at a node 202a-b for XML-based vulnerabilities.

Similar concepts may be used by the test generation engine 502 to generate a test case based on a Namespace Mutation, Element Name Mutation, Attribute Name Mutation, Operation Name Mutation, Operation Parameter Order Mutation, Operation Parameter Type Mutation, Operation Binding Mutation. These mutations may be driven by the XSD, WSDL, WS-I Profile, WS-* and custom constructs for a targeted web service at a node 202a-b.

Illustratively, when the test generation engine 502 encounters certain keywords, such as "unbounded", it generates a test to check for Denial of Service (DoS) type vulnerabilities. For example, web services typically employ parser and application software to process request type documents (requests) sent to the web services. If the keyword "maxOccurs" is specified as unbounded for an element, the test generation engine 502 generates test cases where the number of occurrences of that element increases so as to test the behavior of, e.g., the parser and application software associated with the web services. In extreme cases, when a very large number of elements are sent, the parser or application may crash or hang and is unable to process any further requests.

Another highly exploitable keyword is the XSD keyword "any" as shown in the exemplary XML code below. The "any" keyword enables XML documents to be extended with elements that are not specified within the XSD schema for those documents. The test generation engine 502 recognizes this exposure and adds a Schema with exploitable element definitions such as "unbounded" and "strings." Using these definitions, large number of elements or large string buffers are sent to the target web service as an attack on the service's application or parser.

```
1. <xs:element name="person">
2. <xs:complexType>
3. <xs:sequence>
4. <xs:element name="item_num" type="xs:integer"/>
5. <xs:element name="quantity" type="xs:integer"/>
6. <xs:any/>
7. </xs:sequence>
8. </xs:complexType>
9. </xs:element>
```

The mutations described above are exemplary mutations that may be developed for testing and attacking web services to check for their vulnerabilities. The list of mutations is typically driven by the XSD which could be a custom XSD or an XSD that conforms e.g., to a well-known standard, such as an XSD for WSDL, SOAP, Security Assertion Markup Language (SAML), Web Services Security (WSS), Extensible Access Control Markup Language (XACML), WS-Policy, WS-* and the like. The techniques described herein may also be used for any XSD, WS-I Profiles or custom XML-based grammars.

Figure 6:
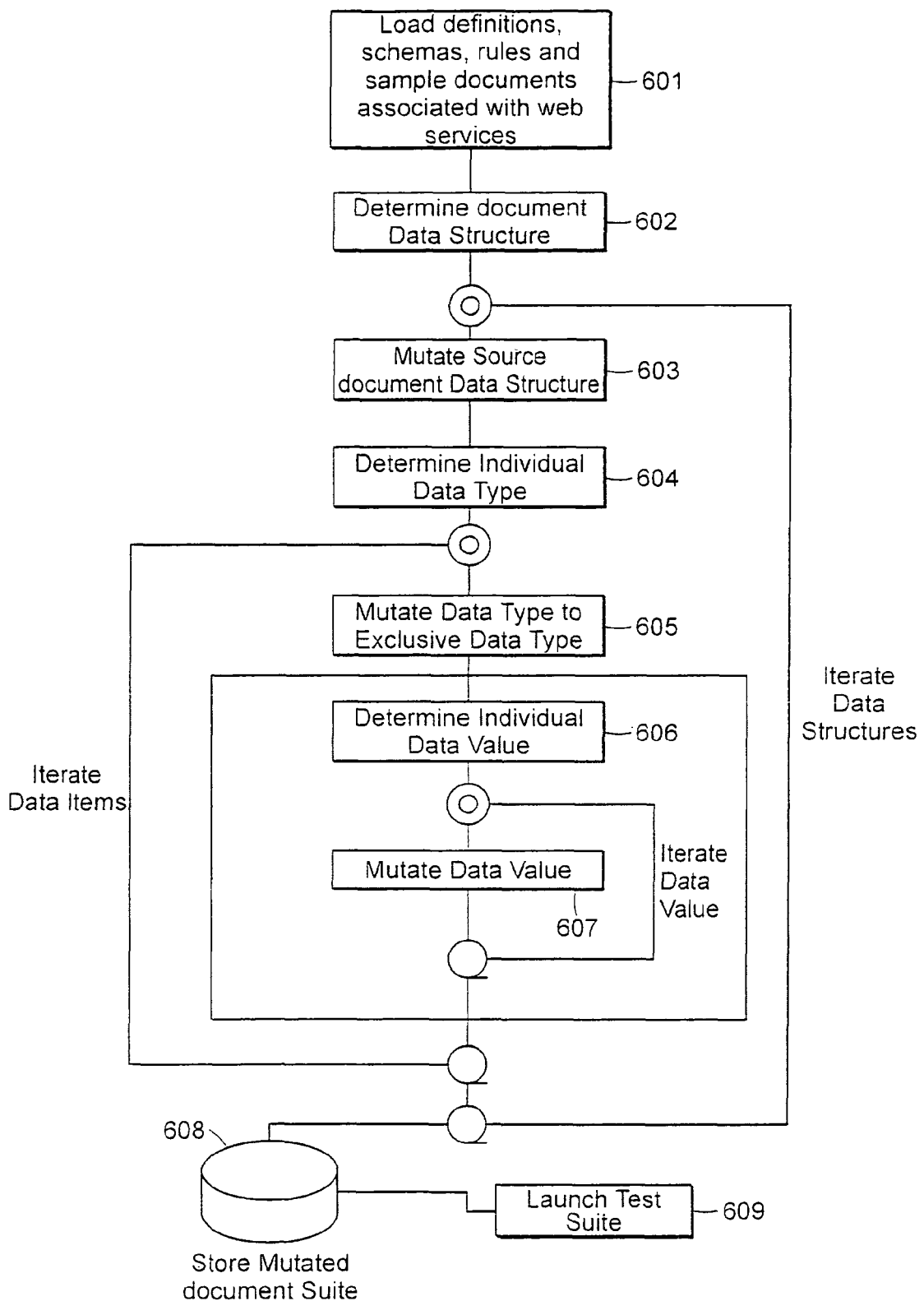
FIG. 6 is a flow chart of a sequence of steps that may be used to generate mutant messages in accordance with the techniques.

FIG. 6 is a flow chart of a technique that may be used for generating mutations to test web services. At step 601, definitions, schemas, rules and sample documents associated with the web services are loaded into the management console 201. These definitions, schemas, rules and sample documents may be e.g., WSDL files, XSD schemas, sample SOAP/XML documents as well as mutation rules spanning WS-I Profile, Schema definition or custom mutation rules. Next at step 602, the Data Structure of a document is determined. This determination may include but is not limited to, determining the root node of the document, the parent-child relationships between the nodes, the number of children, and SOAP Header and Body information associated with the document. Keywords for structural restrictions for the document, such as maximum allowable children defined by the WSDL or XSD for example, are noted. A sample list of restriction keywords is shown in Table 2.

A first iterative loop is set up covering all the data structures for the Message Stucture. The first loop iterates over step 603 that generates multiple structural modifications of the base message structure as determined in step 602. The number of iterations is determined by the number of structural relationships between elements in the base message and the optional restrictions placed on the relationships. For example, a parent element may have only 3 child elements or a SOAP Header may have only one security element.

A second inner iterative loop is set up after determining the Individual Data Types of each elements and attribute in step 604. The second loop then modifies the data types of the elements and the attributes to exclusive data types in step 605. For example, a date type may be mutated to a float, integer, string and all other schema data types.

A third inner iterative loop, set up after step 606, determines a data value for a selected data element or attribute. Keeping the data type fixed from the outer Data Type loop, the data values are changed at step 607. The change in values may be driven by restrictions, default values, enumerations, profile driven data value boundaries and/or randomly generated values for the selected data type.

At step 608, the mutant documents are stored in a data store, such as data store 503. The mutant documents are subsequently launched at the target web services to be tested at step 609. Illustratively, the test launcher 504 reads the mutant documents from the data store 503 and launches them at the web services at nodes 202a-b.

Figure 7A:
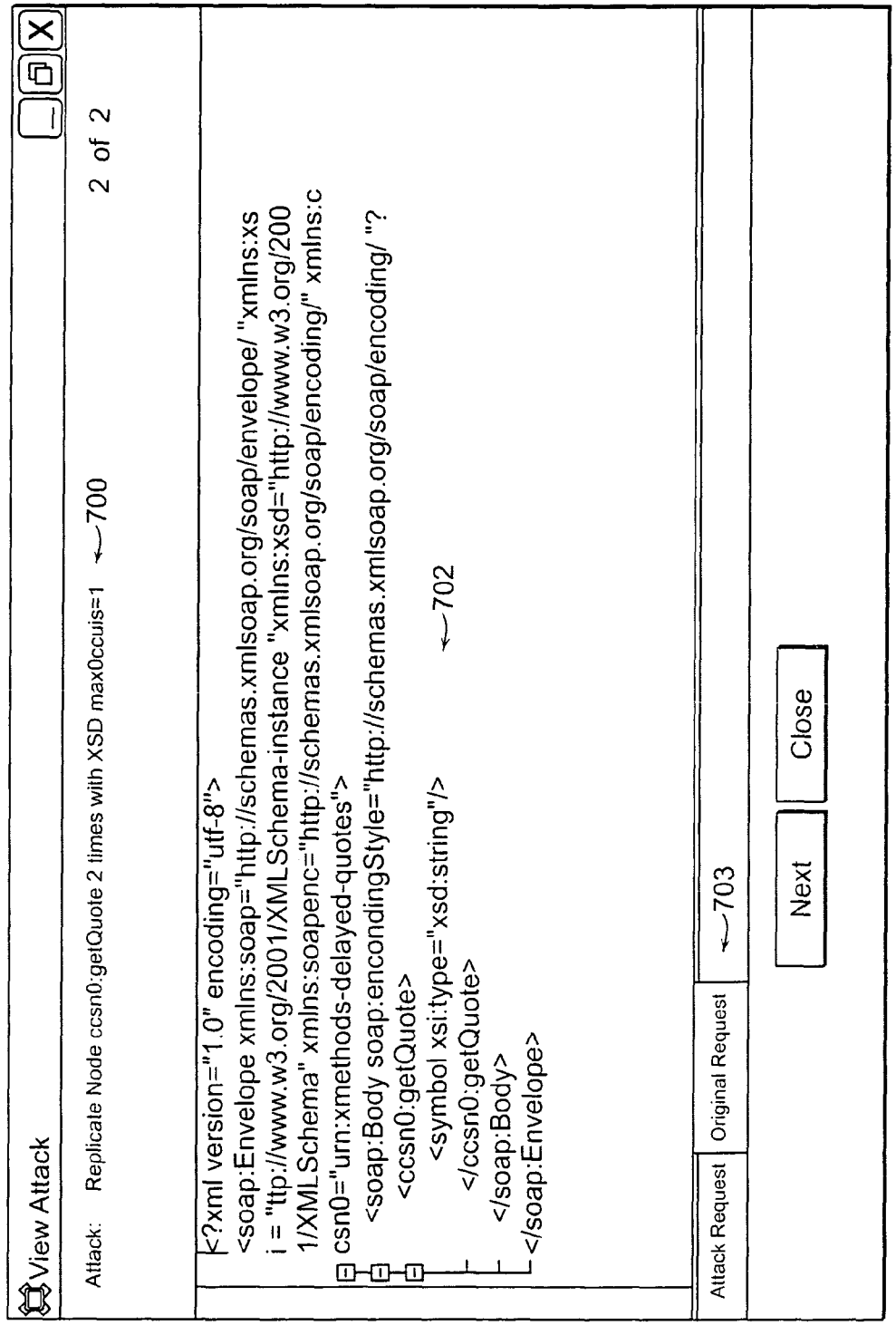
FIG. 7A illustrates an exemplary Simple Object Access Protocol (SOAP) message in accordance with a schema definition for the message.

FIGS. 7A-B illustrate an exemplary an original document and a mutated document containing an XSD-based mutation, respectively. In FIG. 7A, by clicking on the Original Request tab 703, the user establishes focus on the original document 702 which shows a <ccsn0:getQuote> operation with a single <symbol xsi:type="xsd:string"/>. The attack title 700 shows that this mutation replicates the node <ccsn0:getQuote> twice where the XSD corresponding to this message requires a maxOccur=1.

FIG. 7B shows the mutated document (Attack Request) which is based on the original document in FIG. 7A. The mutated document is selected by tab 705. The mutant document 704 contains two instances of <ccsn0:getQuote>. A target web service at nodes 202a-b expects a single instance of <ccsn0:getQuote> and once the mutant document is launched by the test launcher 504, the target web service may e.g., (1) address the mutant request gracefully, (2) throw a verbose exception or (3) become inoperable for subsequent calls. The response analyzer 506 then evaluates the responses or lack of responses and the report generator 508 generates a set of reports on the characteristics of the targeted web service. FIG. 7B also shows a "next" button 706 that may be used to display additional mutations for structure mutations applicable to the selected request.

Figure 8B:
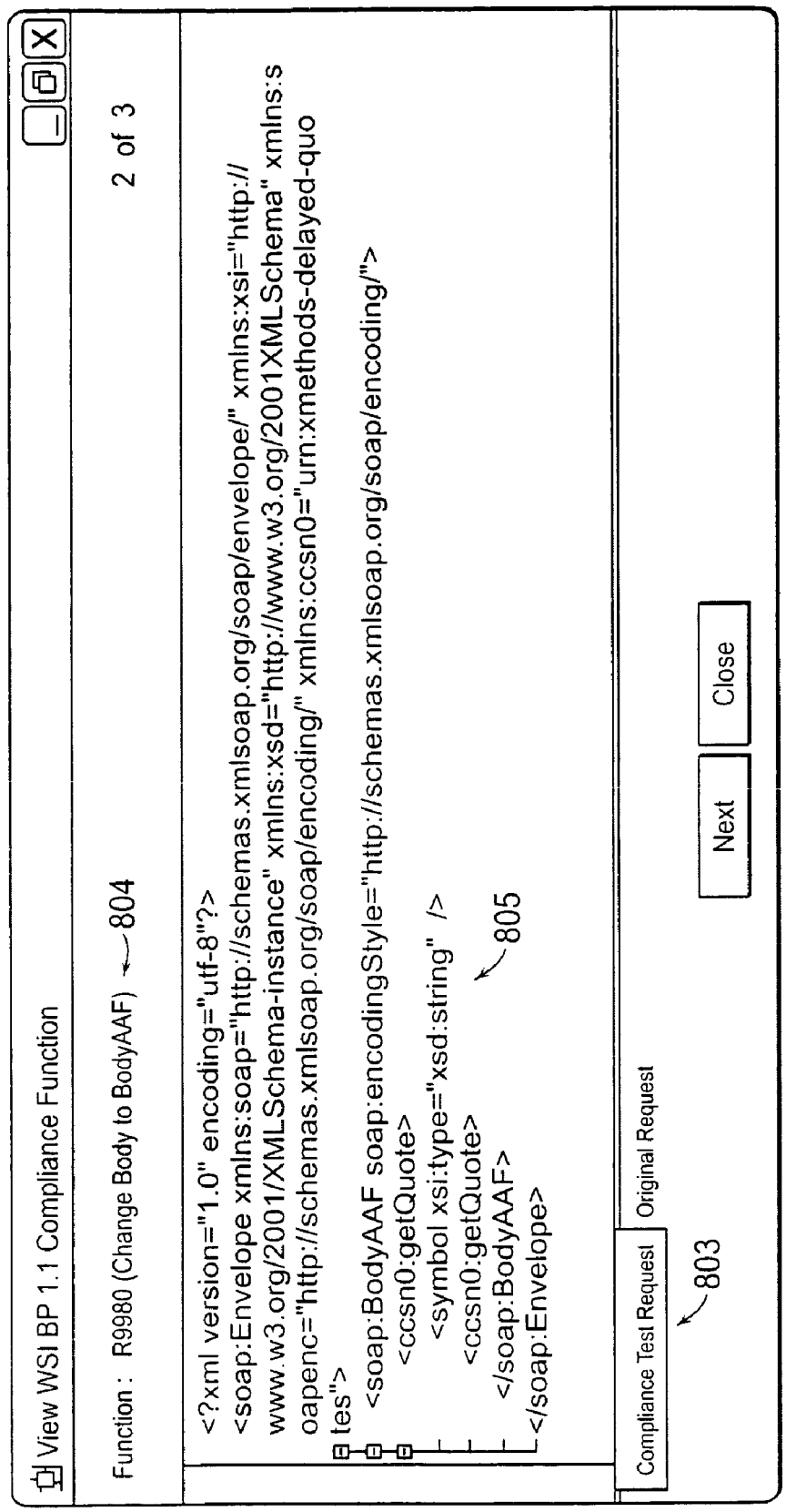
FIG. 8B illustrates a version of the SOAP message in FIG. 8A that is mutated in accordance with the techniques.

FIGS. 8A-B illustrate an exemplary generated test that may be used to test a profile that conforms to the WS-I Basic Profile 1.1 Requirement R9980 as described in "Basic Profile Version 1.1", Final Material, Aug. 24, 2004, which available from the WS-I and which is incorporated by reference in its entirety as though fully set forth herein. The WS-I Basic Profile 1.1 Requirement R9980 notes that 'An ENVELOPE MUST conform to the structure specified in SOAP 1.1 Section 4, "SOAP ENVELOPE" (subject to the amendment of the Profile).' Section 4 of the SOAP 1.1 specification notes that a SOAP Body element name is "BODY."

FIG. 8A shows an Original Request tab 801 selected by the user. This tab displays an original document in panel 802 that shows the SOAP Body named according to the WS-I Basic Profile 1.1 requirements as <soap:Body . . . >. FIG. 8B illustrates a generated test case that may be used to test the above described R9980 requirement. The test case comprises a mutant request which is shown by selecting the Compliance Test Request tab 803. The mutant request is generated using a mutation function 804 which is configured to change a "Body" element from the original document to a mutant value of "BodyAAF". The corresponding SOAP document generated by the mutation function 804 containing the mutant element is displayed at 805. The test case is generated for the WSDL loaded via the WSDL file specified at 400 (FIG. 4) and is specific to the operation in the WSDL file. An initial successful value is inserted by the test generation engine 502 as described above. Once the successful value is available, the test generation engine 502 generates a modified value based on the successful value and the rules in loaded into the console 201. These rules may include rules contained in a standard, such as the previously incorporated SOAP 1.1 specification. In this case, a mutant SOAP Body element is generated. The intent of the modified value is to violate R9980 and observe the response of the targeted web services at nodes 202a-b.

A further test of requirement R9980 may be to modify a required namespace as mandated by Section 4.1.2 of the SOAP 1.1 specification. Requirement R9980 of the WS-I Basic Profile specification is used as a example to illustrate the generation technique. The test generation engine 502 generates exhaustive tests which test additional requirements for the WS-I Basic Profile and its referenced specifications such as the SOAP 1.1 specification.

Generation of tests for interoperability and compliance may be based on standards such as WS-I Basic Profile, WS-I Basic Security Profiles. Tests may be generated based on the SOAP or XML message information defined in XSDs or WSDL's containing XSDs or messages loaded using loader 501.

Figure 9:
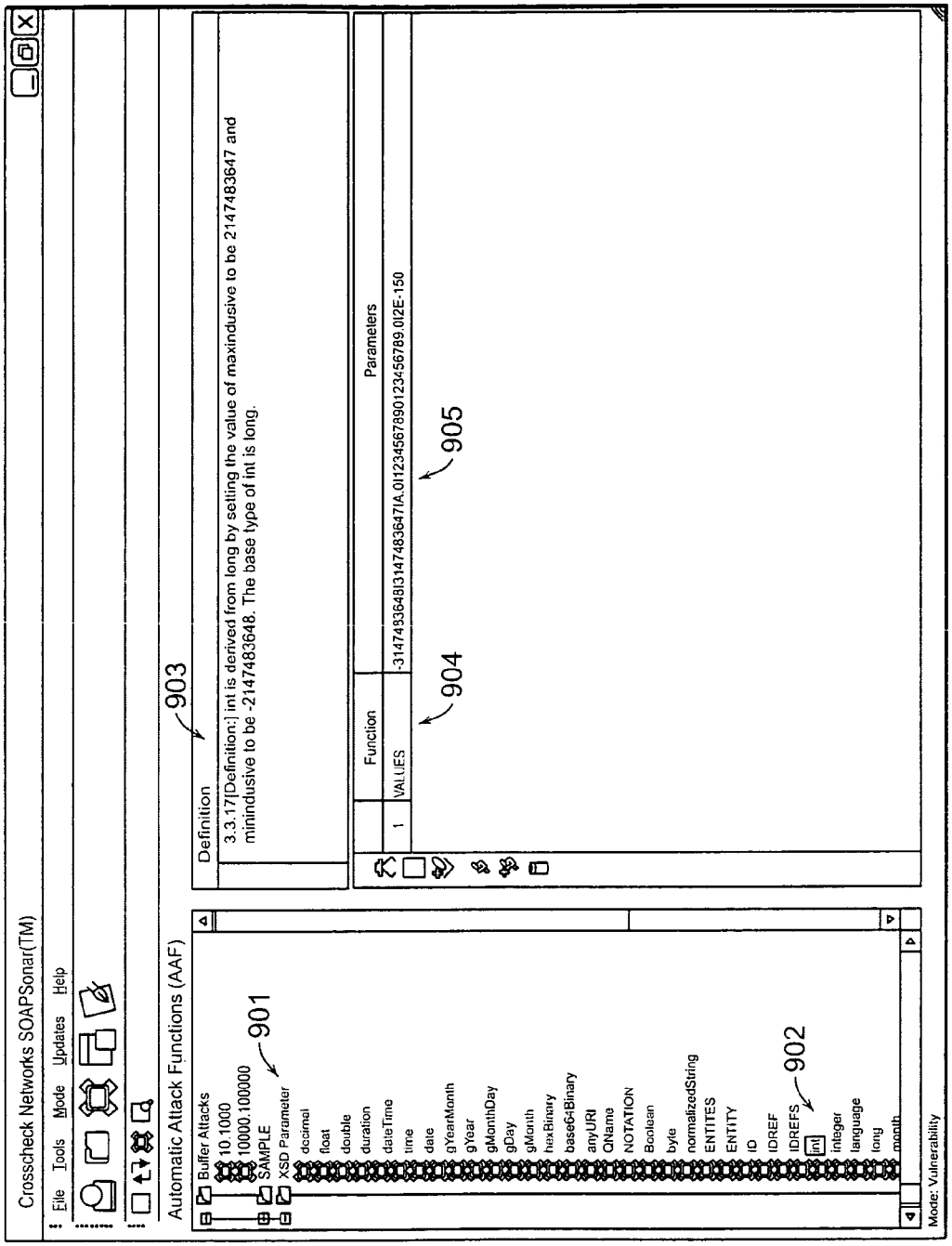
FIG. 9 illustrates an exemplary display that may be employed by a sample tool that enables users to manually author mutation functions in accordance with the techniques.

FIG. 9 illustrates a library of mutations. Additional mutations may be authored, e.g., by a user, and placed in the library. Once a document is loaded using the loader 501, the mutations 901 are selected by the test generation engine 502 and applied to the loaded document as described above. FIG. 9 illustrates a sample library of XSD mutations 901 for the base XSD data-types. As an example, item 902 shows an integer (int) data type with its definition 903 that describes the data type as an "int" with a maximum and a minimum permissible value. The mutation authored for the integer in FIG. 9 shows that the integer mutation assigns mutated VALUES 904 with the different values separated by "|" (pipe) delimiter characters at item 905. The values are set to be outside the bounds of a base integer type and can include values within the integer boundaries as well. Strings, floats, exponents and large integers are delimited as mutant values for this custom authored mutation.

Another aspect of the techniques described herein is exemplified by detection rules that scan through the responses of the web services for exceptions, information leaks, stack traces, and various business sensitive terms, such as Social Security Numbers, credit card numbers and pre-defined irregular content that determines violations.

Figure 10:
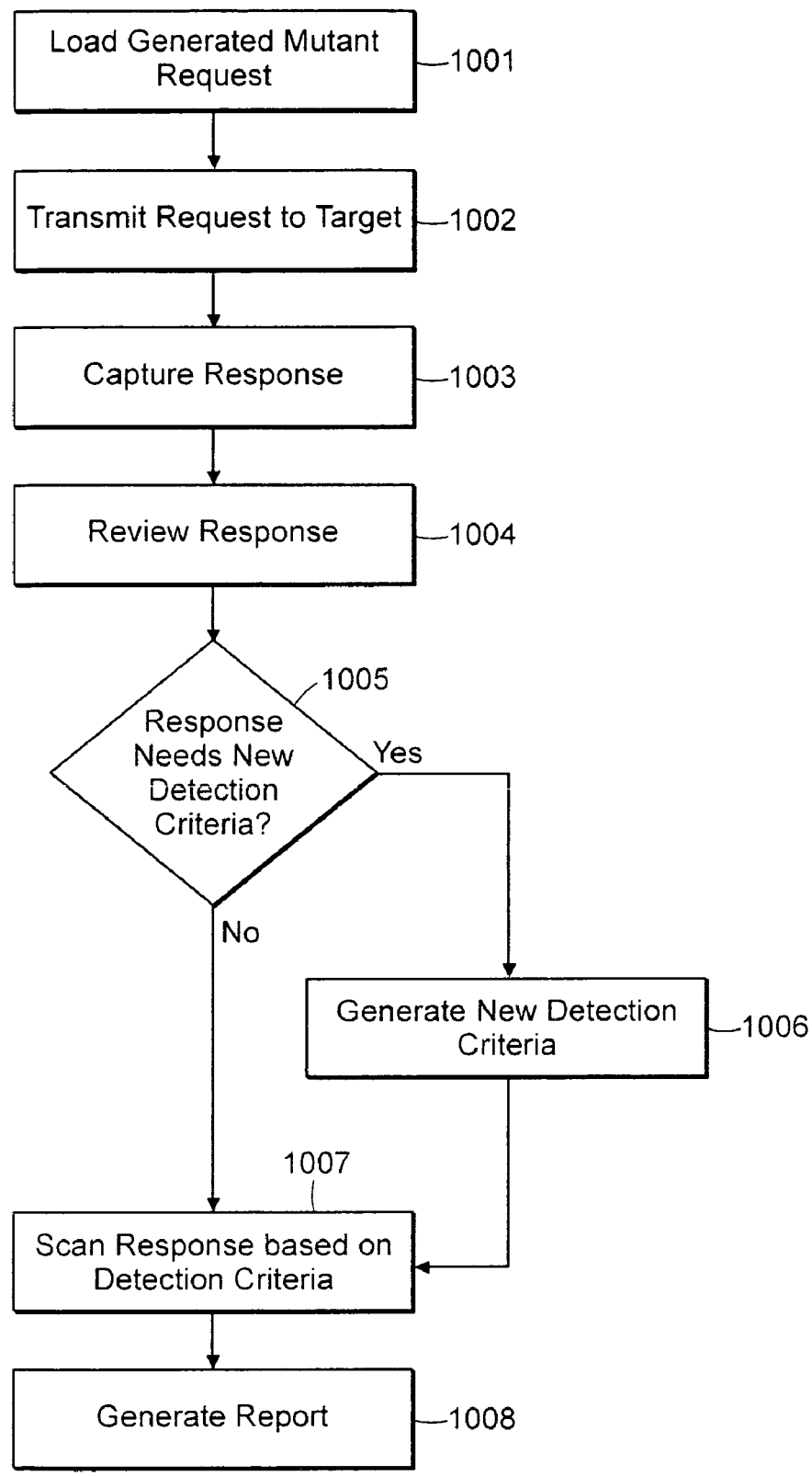
FIG. 10 is a flowchart of a sequence of steps that may be performed as mutant messages are transmitted to a target web service.

Launching mutant messages may result in a variety of responses from the target web services. In accordance with the techniques described herein, these responses are analyzed to understand the characteristics of the target web services. FIG. 10 is a flowchart of a sequence of steps that may be used to process a response in accordance with these techniques. At step 1001, a mutant request generated as described above is loaded e.g., from data store 503. At step 1002, the mutant request is transmitted to the target web service.

At step 1003, a response to the mutant request is captured. At step 1004, the response to the request is stored and may be optionally reviewed as described further below. At step 1005, a check is performed to determine if the response needs new detection criteria. Detection criteria include criteria that are used to detect vulnerabilities, conformance and so on in a response. If new detection criteria are needed, the sequence proceeds to step 1006 where new detection criteria are generated. This new detection criteria may be generated by a user authoring the criteria. At step 1007, the captured responses are scanned for vulnerabilities and so on using existing detection criteria. At step 1008, the results of the scan are aggregated and a report is generated.

FIG. 11 illustrates an exemplary captured response and review display. Panel 1101 depicts an exemplary captured response with a SOAP fault and a stack trace. This response corresponds to a mutant request shown in panel 1102 which belongs to a vulnerability group highlighted in panel 1103. In the response capture and review display, a user has the option to review the response and determine if the response triggered an existing detection criterion. If existing detection criteria are not triggered than the user can choose to author new criteria based on the information in captured response displayed in panel 1101.

Figure 12:
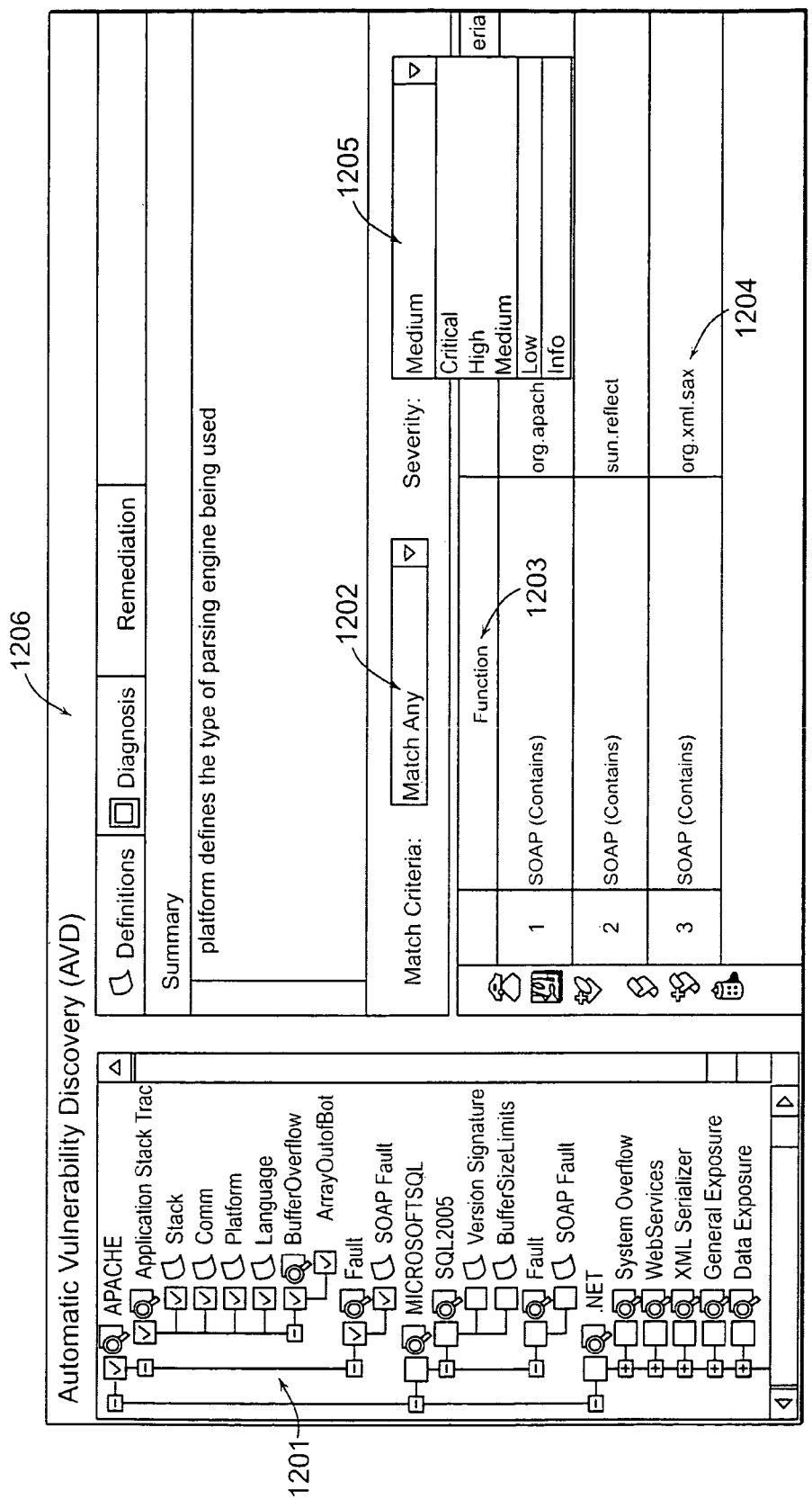
FIG. 12 illustrates an exemplary display that includes a library that existing detection criteria appears in wherein the detection criteria may be organized by target platform, application or an arbitrary category.

FIG. 12 is an exemplary Detection Criteria, Diagnosis and Severity Assignment display. A library of existing detection criteria appears in panel 1201. The detection criteria may be organized by target platform, application or any arbitrary category. Any detection criteria may be enabled or disabled for scanning responses.

To author new detection criteria, the user selects a "Match Criteria" from the drop down widget 1202. The Match Any selection in 1202 yields a match if any of the detection Functions and Values shown in section 1203 match. Additional Match Criteria such as Match All or Match None provide further control in setting complex detection criteria. The function depicted at item 1203 specifies segment and match criterion for the message. In the selected case, function 1203 examines the entire SOAP message to see if it "contains" information such as that depicted at item 1204. The user may add any arbitrary information at section 1204. The user can also assign severity values to the detections as shown in 1205. Remediation and diagnosis information may be authored for the detection scheme using the tabs 1206. The response scanning evaluates each function 1203 and its associated criterion (e.g., the criteria specified at section 1204) for the captured responses. All matched detections are sent to the report generator 508 which aggregates the detection, diagnosis, remediation and severity assignments to generate reports associated with the targeted web service.

FIGS. 13A-B illustrate exemplary reports generated for a targeted web service. The report in FIG. 13A lists vulnerability details for a targeted web service. At the top of the report, section 1301 shows an aggregated vulnerability posture classified by severity levels. Details for the vulnerabilities are likewise listed. Specific vulnerability details, diagnostic information and remediation suggestions are provided in sections 1302, 1303 and 1304, respectively. This information is extracted from the library of detection rules shown in FIG. 12.

FIG. 13B illustrates a report that lists interoperability compliance violations. The severity summary appears at section 1305. All the details of interoperability compliance violations are listed below section 1305. For example, section 1306 shows a violation for WS-I Basic Profile requirement R9980. Sample mutant requests that resulted in such violations are shown in FIGS. 8A-B. An additional high-severity violation is highlighted at section 1307 where "processing instructions" are sent in the mutant message and requirement R1009 of the above WS-I Basic Profile specification states that "processing instructions" are not permitted in a SOAP envelope.

A number of XSD declarations are broad such as "any," "unbounded," "string." In accordance with the techniques described herein, after a WSDL containing an XSD or simply an XSD is loaded, the techniques look for a severity of broad declarations at design time and offers a report showing potential risks with the WSDL or XSD based on the vulnerabilities introduced with the use of open declarations.

It should be noted that seed information required for generating tests is not restricted to XSDs or WSDL. Using proxies or sniffers, sample documents (e.g, XML documents, SOAP documents) may be captured and consumed by the test generation engine 502. The engine 502 may then perform the mutations as described above using the sample documents.

WSDL-blind mutation is also possible where a document is captured using either a proxy, a sniffer or an agent in a variety of deployment modes. WSDL and/or XSD inference may then be used to first generate the WSDL and/or XSD from the sample document and the generated WSDL and/or XSD may then be used by the test generation engine 502 to generate tests as described above.

The above-described techniques may be deployable within a network in a variety of topologies, such as host-based topologies, network-based topologies integrated with firewalls, network-based devices connected to Layer 2 through Layer 7 (L2-7) switches via switched-port analyzers (SPANs), network-based Inline topologies, network-based tap topologies and network-based topologies integrated with L2-7 switches.

It should be noted that the mutant message generation techniques described above are extensible to emerging web services specifications and are not limited the specifications that have been mentioned herein. It should be further noted that the above techniques may be adapted to test services that are not provided by web-based applications. For example, the above techniques may be adapted to test services provided by applications that implement e.g., well-known Remote Procedure Call (RPC) and Common Object Request Broker Architecture (CORBA) techniques.

It should be apparent to one skilled in the art that the software used to implement the above-described techniques may be written in a variety of program languages including but not limited to Java, C++, C#, Visual Basic, C, Python, Perl, Assembler and the like. The present invention may also be deployed on a variety of operating systems including but not limited to Windows 2000/XP/2003, Linux, Solaris, HP-UX, AIX, Mac-OSX and the like.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for detecting vulnerabilities of an application, the method comprising:
identifying interfaces associated with the application from a Web Services Description Language (WSDL) description of the interfaces;
generating a mutant request based on the identified interfaces wherein the request contains one or more mutations driven by the WSDL description;
attacking the application by forwarding the mutant request to the application; and
detecting a vulnerability in the application as a result of the attack.

2. A method as defined in claim 1 further comprising:
loading a description of the interfaces; and
determining interfaces associated with the application from the loaded description.

3. A method as defined in claim 2 wherein the description of the interfaces is contained in a file.

4. A method as defined in claim 1 wherein generating a mutant request includes, for each data structure defined by the WSDL, modifying the data type and value of each element of the data structure.

5. A method as defined in claim 1 wherein a mutation contained in the request is generated from a schema definition mutator.

6. A method as defined in claim 1 wherein a mutation contained in the request is generated from a profile mutator.

7. A method as defined in claim 1 wherein a mutation contained in the request is generated from a custom mutator.

8. A method as defined in claim 1 further comprising:
capturing a response from the application; and
evaluating the results to determine a result of the attack.

9. A method as defined in claim 8 further comprising:
analyzing the response; and
assigning a severity level to the response.

10. A method for detecting vulnerabilities in an application, the method comprising:
identifying interfaces associated with the application from one or more requests for services provided by the application;
generating a Web Services Description Language (WSDL) description from the identified interfaces;
generating a mutant request based on the identified interfaces wherein the request contains one or more mutations driven by the WSDL description;
attacking the application by forwarding the mutant request to the application; and
determining results of the attack.

11. A method as defined in claim 10 further comprising:
loading a description of the interfaces; and
determining interfaces associated with the application from the loaded description.

12. A method as defined in claim 11 wherein the description of the interfaces is contained in a file.

13. A method as defined in claim 10 wherein generating a mutant request includes, for each data structure defined by the WSDL, modifying the data type and value of each element of the data structure.

14. A method as defined in claim 10 wherein a mutation contained in the request is generated from a schema definition mutator.

15. A method as defined in claim 10 wherein a mutation contained in the request is generated from a profile mutator.

16. A method as defined in claim 10 wherein a mutation contained in the request is generated from a custom mutator.

17. A method as defined in claim 10 further comprising:
capturing a response from the application; and
evaluating the results to determine a result of the attack.

18. A method as defined in claim 17 further comprising:
analyzing the response; and
assigning a severity level to the response.

19. An apparatus for detecting vulnerabilities in an application, the apparatus comprising:
a memory; and
a processor coupled to the memory, the processor configured to:
(a) identify interfaces associated with the application from a Web Services Description Language (WSDL) description of the interfaces,
(b) generate a mutant request based on the identified interfaces wherein the request contains one or more mutations driven by the WSDL description,
(c) attack the application by forwarding the mutant request to the application, and
(d) detect a vulnerability in the application as a result of the attack.

20. An apparatus as defined in claim 19 wherein the processor is further configured to:
load a description of the interfaces, and
determine interfaces associated with the application from the loaded description.

21. An apparatus as defined in claim 20 wherein the description of the interfaces is contained in a file.

22. An apparatus as defined in claim 19 wherein the processor is configured to generate the mutant request by, for each data structure defined by the WSDL, modifying the data type and value of each element of the data structure.

23. An apparatus as defined in claim 19 wherein a mutation contained in the request is generated from a schema definition mutator.

24. An apparatus as defined in claim 19 wherein a mutation contained in the request is generated from a profile mutator.

25. An apparatus as defined in claim 19 wherein a mutation contained in the request is generated from a custom mutator.

26. An apparatus as defined in claim 19 wherein the processor is further configured to:
capture a response from the application; and
evaluate the results to determine a result of the attack.

27. An apparatus as defined in claim 26 wherein the processor is further configured to:
analyze the response; and
assign a severity level to the response.

28. An apparatus for detecting vulnerabilities in an application, the apparatus comprising:
a memory; and
a processor coupled to the memory, the processor configured to:
(a) identify interfaces associated with the application from one or more requests for services provided by the application,
(b) generate a Web Services Description Language (WSDL) description from the identified interfaces;
(c) generate a mutant request based on the identified interfaces wherein the request contains one or more mutations driven by the WSDL description,
(d) attack the application by forwarding the mutant request to the application, and
(e) determine results of the attack.

29. A method for detecting vulnerabilities of an application, the method comprising:
identifying interfaces associated with the application from a Web Services Description Language (WSDL) description of the interfaces;
generating a mutant request based on the identified interfaces wherein the request contains one or more mutations driven by the WSDL description;
attacking the application by forwarding the mutant request to the application;
capturing a response from the application;
analyzing the response; and
assigning a severity level to the response.

* * * * *